United States Patent
Balasubramanian et al.

(10) Patent No.: US 12,269,610 B2
(45) Date of Patent: Apr. 8, 2025

(54) SYSTEMS AND METHODS FOR PROVIDING SAFE LANDING ASSISTANCE FOR AN AERIAL VEHICLE

(71) Applicant: Honeywell International Inc., Charlotte, NC (US)

(72) Inventors: Jayasenthilnathan Balasubramanian, Phoenix, AZ (US); Byron Birkedahl, Phoenix, AZ (US); Kalimulla Khan, Karnataka (IN); Srihari Jayathirtha, Atlanta, GA (US)

(73) Assignee: Honeywell International Inc., Charlotte, NC (US)

( * ) Notice: Subject to any disclaimer, the term of this patent is extended or adjusted under 35 U.S.C. 154(b) by 134 days.

(21) Appl. No.: 17/570,834

(22) Filed: Jan. 7, 2022

(65) Prior Publication Data

US 2023/0150690 A1    May 18, 2023

(30) Foreign Application Priority Data

Nov. 15, 2021   (IN) .............................. 202111052281

(51) Int. Cl.
  *B64D 43/00*   (2006.01)
  *B64D 43/02*   (2006.01)
  (Continued)

(52) U.S. Cl.
  CPC ............. *B64D 45/08* (2013.01); *B64D 43/02* (2013.01); *G01C 23/005* (2013.01)

(58) Field of Classification Search
  CPC ........ B64D 45/08; B64D 43/02; B64D 43/00; B64D 45/04; G01C 23/005; G01C 23/00
  (Continued)

(56) References Cited

U.S. PATENT DOCUMENTS 4,551,723 A * 11/1985 Paterson ................ G01C 5/005
                                                        340/963
7,106,217 B2    9/2006 Judge et al.
(Continued)

FOREIGN PATENT DOCUMENTS

FR        3110728 A1    11/2021
GB        2446941 A *   8/2008 ............... G01S 3/80

OTHER PUBLICATIONS

EP Office Action Mailed on Oct. 2, 2023 for EP Application No. 22203931, 8 page(s).
(Continued)

*Primary Examiner* — Jelani A Smith
*Assistant Examiner* — George A Alcorn, III
(74) *Attorney, Agent, or Firm* — Alston & Bird LLP

(57) ABSTRACT

Disclosed are systems, methods, and non-transitory computer-readable medium for providing a safe landing for an aerial vehicle. The method may include: displaying, on one or more displays, an aerial vehicle, an intended landing zone, and a real-time flight path of the vehicle as the vehicle approaches the intended landing zone; receiving data related to one or more of the vehicle, the flight path of the vehicle, the intended landing zone, and an obstacle; determining the proximity of the vehicle relative to the center of the intended landing zone based on the received data; displaying the proximity of the vehicle relative to the center of the intended landing zone; displaying the obstacle when present; displaying an alert when the vehicle deviates in proximity to the center of the intended landing zone and/or approaches the obstacle; and upon determining a failure to respond to the alert computing flight controls to modify landing.

20 Claims, 11 Drawing Sheets

(51) Int. Cl.
*B64D 45/04* (2006.01)
*B64D 45/08* (2006.01)
*G01C 23/00* (2006.01)

(58) Field of Classification Search
USPC .......................................................... 701/2
See application file for complete search history.

(56) References Cited

U.S. PATENT DOCUMENTS

| | | | |
|---|---|---|---|
| 8,019,490 | B2 | 9/2011 | Ferren et al. |
| 8,188,890 | B2 | 5/2012 | He |
| 8,195,347 | B2 | 6/2012 | Boorman |
| 8,485,029 | B2 | 7/2013 | Anders |
| 9,384,670 | B1 | 7/2016 | Fisher et al. |
| 10,024,686 | B2 | 7/2018 | Canale et al. |
| 10,403,158 | B2 | 9/2019 | Lieberman et al. |
| 2005/0216138 | A1* | 9/2005 | Turung ................ G01C 5/005 701/3 |
| 2009/0048724 | A1 | 2/2009 | Caule |
| 2009/0138138 | A1 | 5/2009 | Ferren et al. |
| 2010/0023189 | A1 | 1/2010 | Suddreth et al. |
| 2010/0156758 | A1* | 6/2010 | Anders ................ G01C 23/005 701/16 |
| 2011/0106345 | A1* | 5/2011 | Takacs ................ G05D 1/0676 701/16 |
| 2012/0314032 | A1* | 12/2012 | Muensterer ............... G01S 7/51 348/46 |
| 2013/0001366 | A1 | 1/2013 | Wolff et al. |
| 2013/0218374 | A1 | 8/2013 | Lacko et al. |
| 2014/0129058 | A1 | 5/2014 | Elahi et al. |
| 2014/0343764 | A1 | 11/2014 | Sacle et al. |
| 2016/0152348 | A1 | 6/2016 | Mohideen et al. |
| 2016/0217697 | A1* | 7/2016 | Huber .................. G05D 1/0646 |
| 2016/0247406 | A1 | 8/2016 | Khatwa et al. |
| 2017/0162066 | A1* | 6/2017 | Scacchi ................ G05D 1/0676 |
| 2018/0130363 | A1* | 5/2018 | Yvetot .................... G01C 23/00 |
| 2018/0217596 | A1* | 8/2018 | Groden .................. B64U 70/95 |
| 2019/0279516 | A1 | 9/2019 | Pr et al. |
| 2020/0310467 | A1 | 10/2020 | Birkedahl et al. |
| 2021/0082295 | A1 | 3/2021 | Surace |
| 2021/0240986 | A1* | 8/2021 | Gurajapu ............. G08G 5/0052 |
| 2022/0041298 | A1* | 2/2022 | Schurek ............. G08G 5/0086 |

OTHER PUBLICATIONS

Extended European Search Report Mailed on Apr. 12, 2023 for EP Application No. 22203931, 12 page(s).
Communication about intention to grant a European patent Mailed on May 28, 2024 for EP Application No. 22203931, 6 page(s).
Decision to grant a European patent Mailed on Aug. 16, 2024 for EP Application No. 22203931, 2 page(s).

* cited by examiner

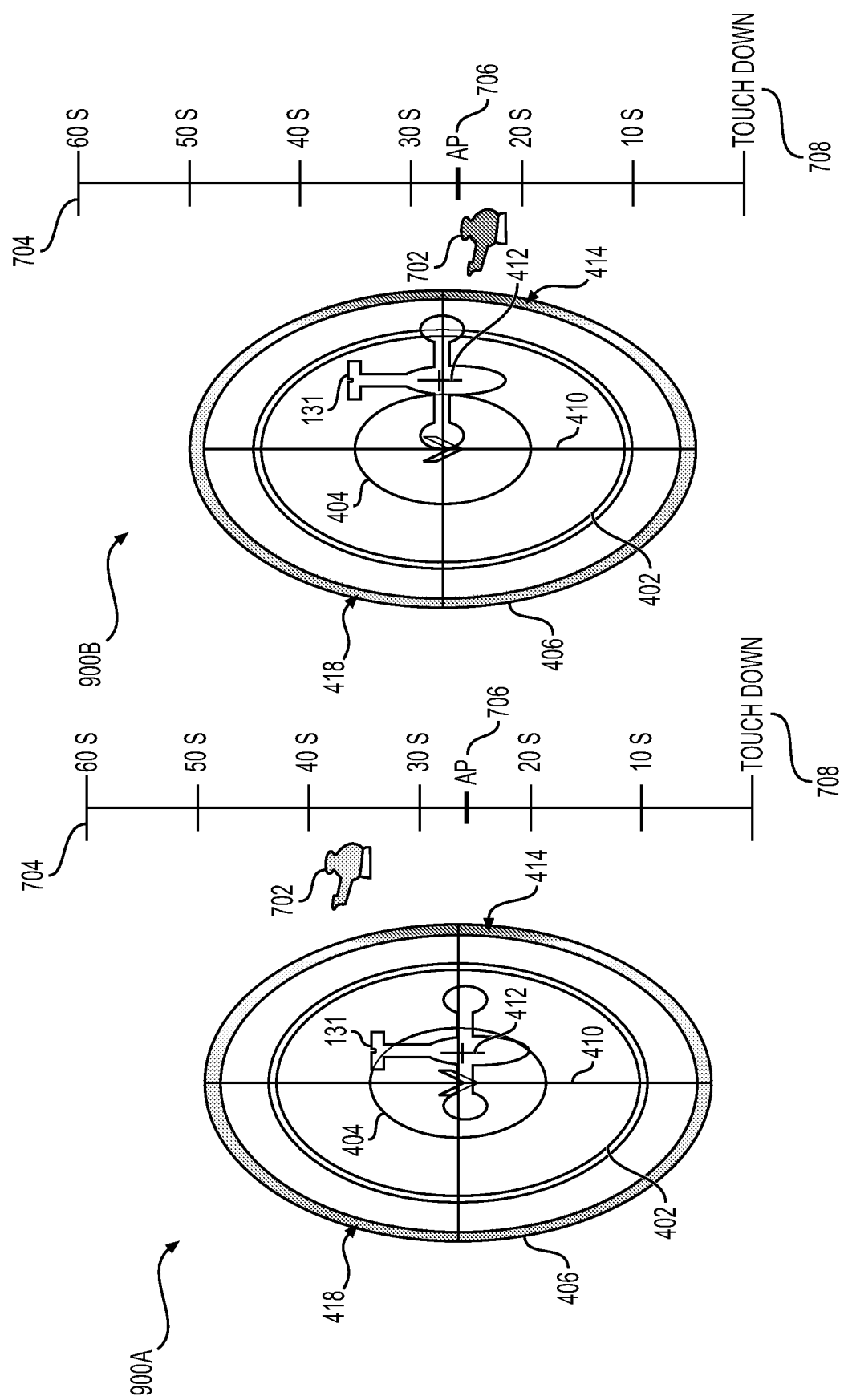

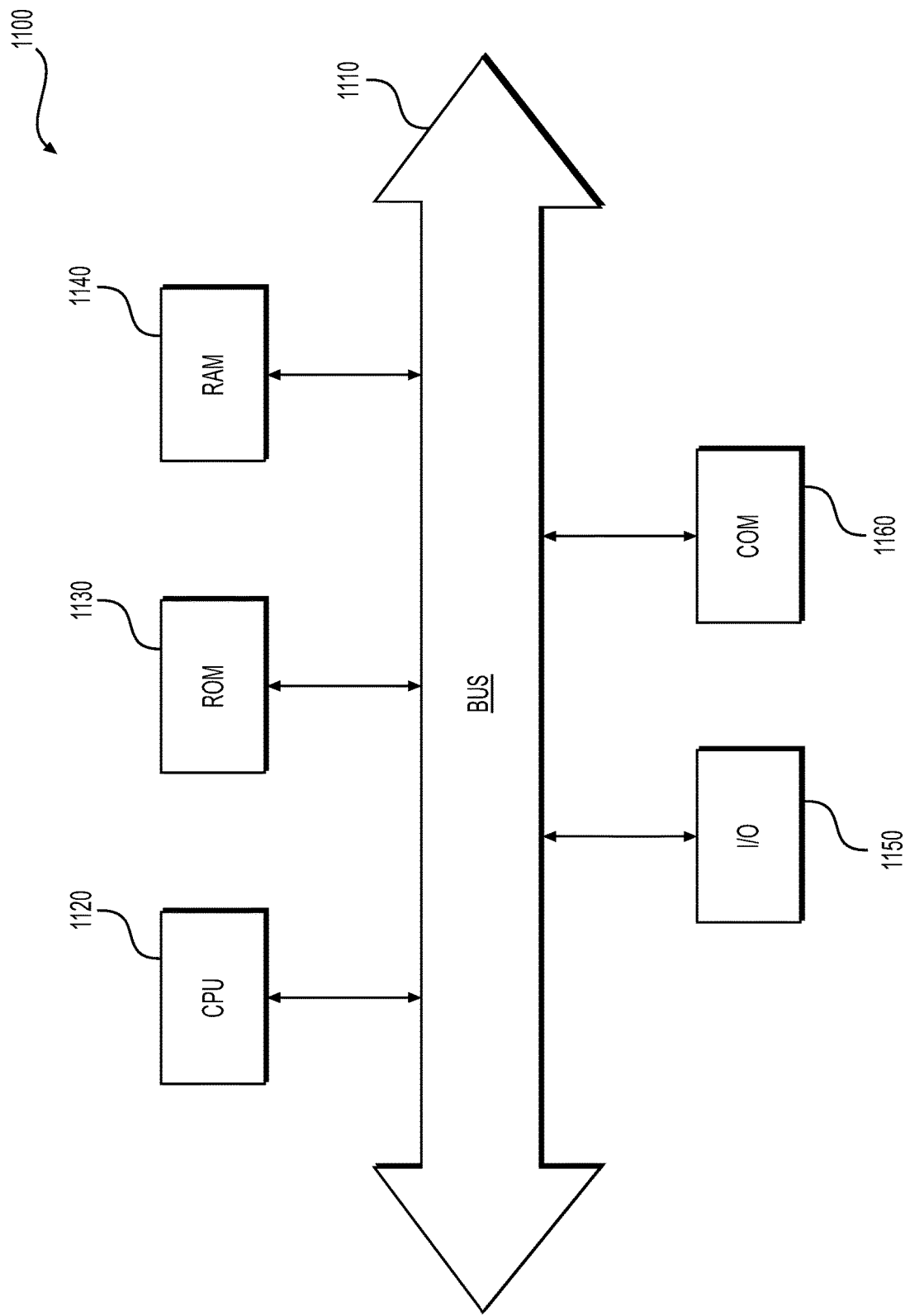

SYSTEMS AND METHODS FOR PROVIDING SAFE LANDING ASSISTANCE FOR AN AERIAL VEHICLE

CROSS-REFERENCE TO RELATED APPLICATIONS

This application claims the benefit of priority under 35 U.S.C. § 119 from Indian Patent Application No. 202111052281, filed on Nov. 15, 2021, the contents of which are incorporated by reference in their entirety.

TECHNICAL FIELD

Various embodiments of the present disclosure relate generally to landing systems for aerial vehicles and more particularly, to systems and methods for providing safe landing assistance for such vehicles.

BACKGROUND

The landing phase remains a critical phase for all aerial vehicles, including urban air mobility (UAM) vehicles and vertical takeoff and landing (VTOL) vehicles, due to a variety of challenges (e.g., low visibility conditions, pilot spatial disorientation, landing zone intrusions, high speeds, wind gusts, and communication interference) that may impact a pilot's ability to safely land. In addition to the above challenges, the landing phase is especially critical for UAM vehicles in urban or similar environments due to constrained landing spaces surrounded by adjacent buildings, populated airspace, the city below, or other obstacles around the landing space. For instance, even the slightest misalignment during a rooftop landing or other similar constrained landing space without sufficient time to correct may result in a variety of consequences. Therefore, in a constrained landing space, such as over a building, the margin of error when landing is limited, which may present challenges for on-board pilots, remote pilots, and/or autonomous aircraft alike.

Conventional systems and methods for landing vehicles do not currently provide the precise situational awareness for pilots with varying skillsets, nor do they provide the safety considerations necessary for landing vehicles in constricted urban environments. The present disclosure is directed to overcoming one or more of these above-referenced challenges.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for providing a safe landing for a vehicle.

In one embodiment, a method may include: displaying, on one or more displays, a vehicle, an intended landing zone, and a real-time flight path of the vehicle as the vehicle approaches the intended landing zone; receiving, by one or more processors, data related to one or more of the vehicle, the flight path of the vehicle, the intended landing zone, and an obstacle; determining, by the one or more processors, the proximity of the vehicle relative to the center of the intended landing zone based on the received data; causing, by the one or more processors, the one or more displays to display the proximity of the vehicle relative to the center of the intended landing zone; causing, by the one or more processors, the one or more displays to display the obstacle when present; causing, by the one or more processors, the one or more displays to display an alert when the vehicle deviates in proximity to the center of the intended landing zone and/or approaches the obstacle; and upon determining a failure to respond to the alert, by the one or more processors, computing flight controls to modify landing.

In another embodiment, a system may include: one or more sensors; one or more databases; a vehicle management system; and one or more displays. The one or more sensors of the system may be executed by one or more processors and configured to: determine one or more obstacles at an intended landing zone of a vehicle and/or along a flight path of the vehicle; determine a position and/or altitude of the vehicle relative to the intended landing zone; and transmit sensor data to one or more display, a vehicle management system, and/or a flight guidance component. The one or more databases of the system may be configured to: transmit data related to one or more of a flight path of the vehicle, an intended landing zone, or obstacles, to one or more displays and a vehicle management system. The vehicle management system may be executed by one or more processors and configured to: receive data from one or more sensors; receive data from one or more databases; process the data received from the one or more sensors with the data received from the one or more databases; and transmit the processed data to a flight guidance component and/or one or more displays. The one or more displays of the system may be executed by one or more processors and configured to: receive data from one or more databases, a vehicle management system, and/or a flight guidance component; and display the received data.

In yet another embodiment, a non-transitory computer-readable medium may store instructions that, when executed by a processor, cause the processor to perform a method. The method may include: displaying, on one or more displays, a vehicle, an intended landing zone, and a real-time flight path of the vehicle as the vehicle approaches the intended landing zone; receiving, by one or more processors, data related to one or more of the vehicle, the flight path of the vehicle, the intended landing zone, and an obstacle; determining, by the one or more processors, the proximity of the vehicle relative to the center of the intended landing zone based on the received data; causing, by the one or more processors, the one or more displays to display the proximity of the vehicle relative to the center of the intended landing zone; causing, by the one or more processors, the one or more displays to display the obstacle when present; causing, by the one or more processors, the one or more displays to display an alert when the vehicle deviates in proximity to the center of the intended landing zone and/or approaches the obstacle; and upon determining a failure to respond to the alert, by the one or more processors, computing flight controls to modify landing.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 8A-8B, 9A-9B, and 10A-10B depict various exemplary landing scenarios of a vehicle as displayed with landing aids generated by the system of FIG. 2, according to one or more embodiments.

FIG. 11 depicts an example system that may execute techniques presented herein.

DETAILED DESCRIPTION

In general, the present disclosure is directed to systems and methods for providing a safe landing for a vehicle using an intuitive display of a landing aid and an alert system, and by computing flight controls to modify landing, if necessary. A system of the present disclosure may include one or more displays depicting landing details for a vehicle. The landing details may be displayed with a landing orientation aid and with a time/altitude relative to touchdown scale. The landing orientation aid may depict the proximity of the vehicle relative to the center of the intended landing zone and the time/altitude to touchdown scale may depict the amount of time and/or altitude of the vehicle until it reaches touchdown at the landing zone. Additionally, the time/altitude relative to touchdown scale may indicate an abort point, at which point an alert will be issued to abort the attempted landing.

The system may generate the one or more displays by determining the proximity of the vehicle relative to the intended landing zone, the vehicle descent conditions, and landing obstacles based on data processed and received from one or more databases (e.g., Vertiport database, Obstacle database, Nav database) and onboard sensors. The system may process the data received using a vehicle management system and a flight guidance component of the system may further process the data to generate flight guidance for the one or more displays. For instance, a system of the present of the disclosure may depict the orientation of the vehicle relative to the intended landing zone, the presence and/or direction of deviation from the intended landing zone, ways to correct alignment/orientation with the landing zone, the amount of time available for adjusting alignment/orientation with the landing zone, and landing zone obstacles, as well as alerts to indicate when any of these factors impact a safe landing. Furthermore, the system of the present disclosure may also compute flight controls to modify the vehicle landing in situations where there is no response to the alert from the vehicle's pilot/operator and/or corrective action is too late.

In some embodiments, the landing zone or intended landing zone may be an elevated landing port/hub or a building. In some embodiments, the one or more displays may be displayed onboard a vehicle, while in other embodiments the one or more displays may be displayed off-board a vehicle, such as a remote operations ground station.

While this disclosure describes the systems and methods with reference to UAM vehicles and VTOL vehicles, it should be appreciated that the present systems and methods are also applicable to management of other types of vehicles, including those of aircraft, drones, automobiles, ships, spacecraft, or any other manned, unmanned, autonomous and/or Internet-connected vehicle.

Figure 1:
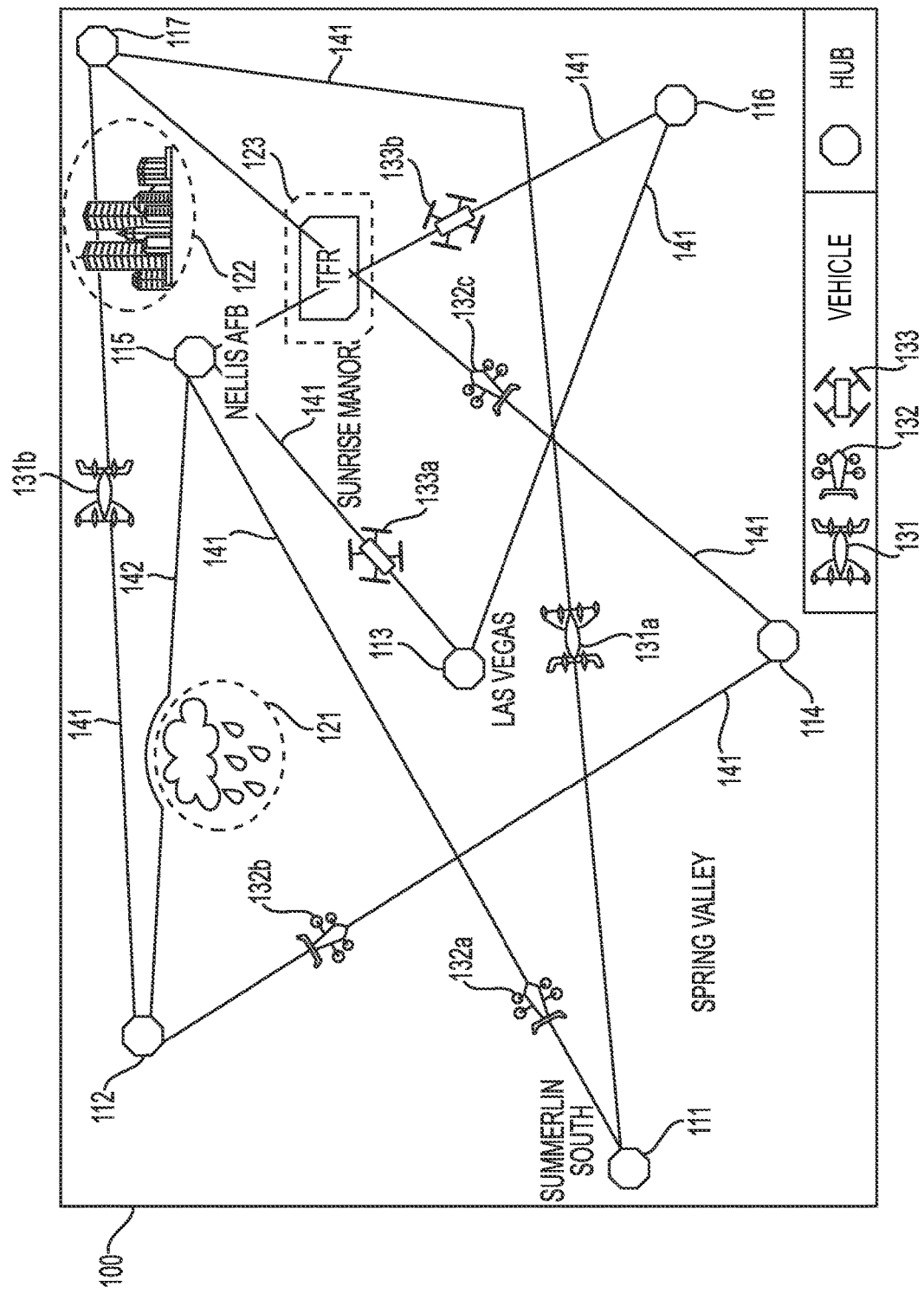
FIG. 1 depicts an example environment in which methods, systems, and other aspects of the present disclosure may be implemented.

FIG. 1 depicts an example environment in which methods, systems, and other aspects of the present disclosure may be implemented. The environment of FIG. 1 may include an airspace 100 and one or more hubs 111-117. A hub, such as any one of the one or more hubs 111-117, may be a facility where one or more vehicles 131a-133b may take off, land, or remain parked (e.g., airport, vertiport, heliport, vertistop, helistop, temporary landing/takeoff facility, or the like). The airspace 100 may accommodate vehicles 131a-133b of various types 131-133 (collectively, "vehicle 131" unless indicated otherwise herein), flying at various altitudes and via various routes 141. A vehicle, such as any one of the vehicles 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), an urban air mobility (UAM) vehicle, a hot-air balloon, a military aircraft, etc. Any one of the vehicles 131a-133b may be connected to one another and/or to one or more of the hubs 111-117, over a communication network. As shown in FIG. 1, different types of vehicles that share the airspace 100 are illustrated, which are distinguished, by way of example, as model 131 (vehicle 131a and vehicle 131b), model 132 (vehicle 132a, vehicle 132b, and vehicle 132c), and model 133 (vehicle 133a and vehicle 133b).

As further shown in FIG. 1, an airspace 100 may have one or more weather constraints 121, spatial restrictions 122 (e.g., buildings), and temporary flight restrictions (TFR) 123. These are exemplary factors that a vehicle management system of a vehicle 131a-133b may be required to consider and/or analyze in order to derive the most safe and optimal flight trajectory of the vehicle. For example, if a vehicle management system of a vehicle 131a-133b planning to travel from hub 112 to hub 115 predicts that the vehicle may be affected by an adverse weather condition, such as weather constraint 121, in the airspace, the vehicle management system may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the vehicle (e.g., 4-D coordinates of the flight trajectory) do not intersect any position and time coordinates of the weather constraint 121 (e.g., 4-D coordinates of the weather constraint 121).

As another example, the vehicle management system of vehicle 131*b* may predict, prior to take-off, that spatial restriction 122, caused by buildings, would hinder the direct flight path of aircraft 131*b* flying from hub 112 to hub 117, as depicted in FIG. 1. In response to that prediction, the vehicle management system of vehicle 131*b* may generate a 4-D trajectory with a vehicle path that bypasses a 3-dimensional zone (e.g., zone including the location and the altitude) associated with those particular buildings. As yet another example, the vehicle management system of vehicle 133*b* may predict, prior to take-off, that TFR 123, as well as some potential 4-D trajectories of another vehicle 132*c*, would hinder or conflict with the direct flight path of vehicle 133*b*, as depicted in FIG. 1. In response, the vehicle management computer of vehicle 133*b* may generate a 4-D trajectory with path and time coordinates that do not intersect either the 4-D coordinates of the TFR 123 or the 4-D trajectory of the other aircraft vehicle 132*c*. In this case, the TFR 123 and collision risk with another vehicle 132*c* are examples of dynamic factors which may or may not be in effect, depending on the scheduled time of travel, the effective times of TFR, and the path and schedule of the other vehicle 132*c*. As described in these examples, the 4-D trajectory derivation process, including any modification or re-negotiation, may be completed prior to take-off of the vehicle.

As another example, the vehicle management computer of vehicle 131*b* may determine to use one of the routes 141 that are set aside for vehicle 131*b* to use, either exclusively or non-exclusively. The vehicle 131*b* may generate a 4-D trajectory with a vehicle path that follows one of the routes 141.

As indicated above, FIG. 1 is provided merely as an example environment of an airspace that includes exemplary types of vehicles, hubs, zones, restrictions, and routes. Regarding particular details of the vehicle, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
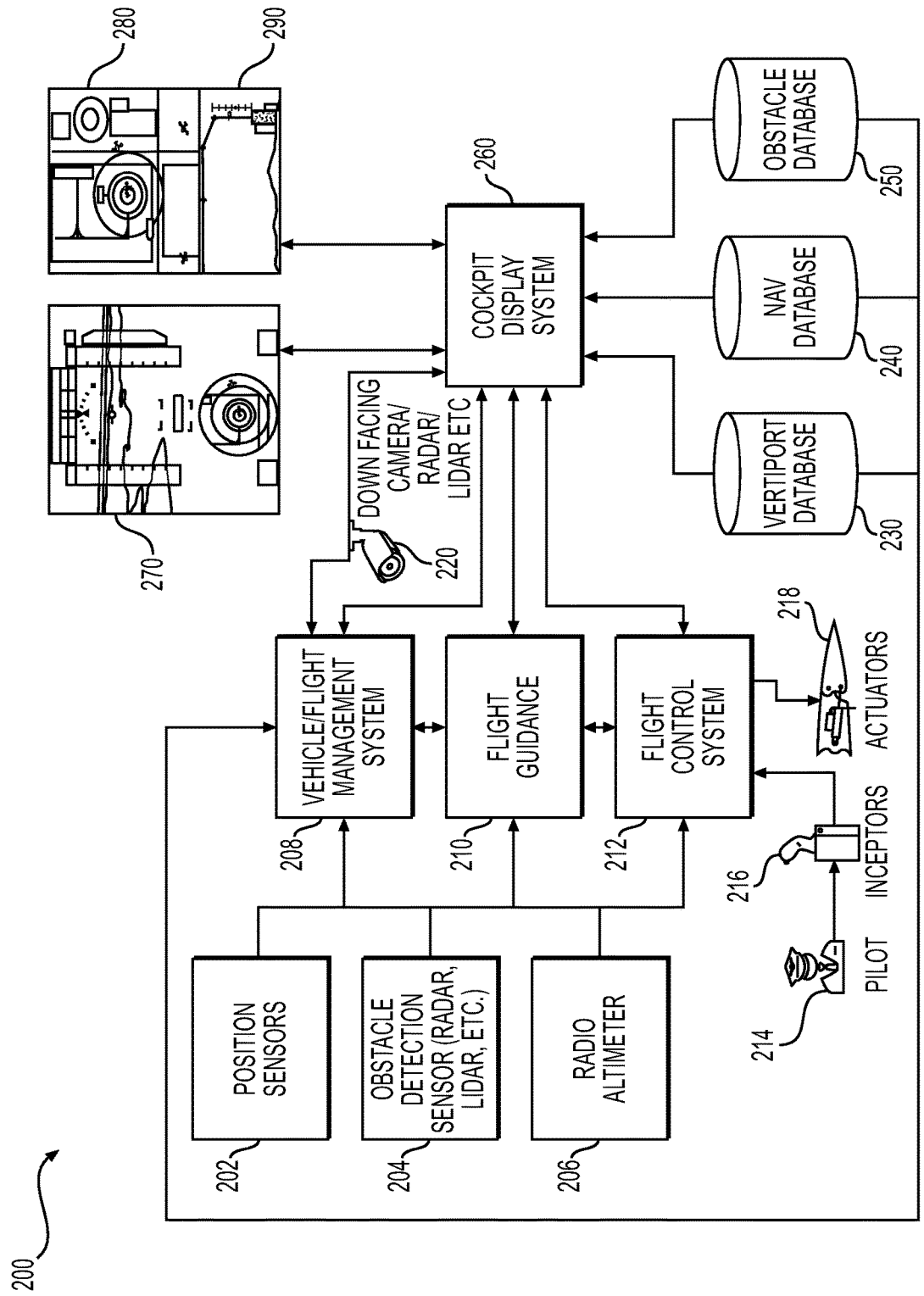
FIG. 2 depicts an exemplary system for providing safe landing assistance for a vehicle, according to one or more embodiments.

FIG. 2 depicts an exemplary block diagram of a system 200, of a vehicle, such as vehicle 131*a*-133*b*. Generally, the block diagram of system 200 may depict system components, information/data, and communications between the system components of a piloted, semi-autonomous, or a fully autonomous vehicle. The vehicle 131 may be one of the piloted, semi-autonomous vehicles, and/or the fully autonomous vehicles.

The block diagram of system 200 of vehicle 131 may include electrical, mechanical, and/or software system components (collectively, "vehicle system components"). The vehicle system components may include: position sensors 202, obstacle detection sensor(s) 204, radio altimeter 206, vehicle/flight management system 208, flight guidance 210, and flight control system 212. The vehicle system components may also include pilot/user interface 214, inceptors 216, actuators 218, camera(s) 220. Also included in block diagram 200 is vertiport database 230, Navigational (nav) database 240, obstacle database 250, and cockpit display system 260. The vehicle system components may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle/flight management system 208 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may obtain inputs from other vehicle system components and output instructions/data, in accordance with the program code of the vehicle management program. For instance, the vehicle/flight management system 208 may receive sensor data from position sensors 202, obstacle detection sensor 204, and radio altimeter 206, and camera(s) 220. Vehicle/flight management system 208 may also receive data from vertiport database 230, Nav database 240, and obstacle database 250. The vehicle/flight management system 208 may process the received data and may transmit instructions/data to cockpit display system 260 and/or flight guidance component 210. The vehicle/flight management system 208 may also receive data from flight guidance component 210 and/or cockpit display system 260.

The vehicle management program of vehicle/flight management system 208 may include flight routing to determine or receive a planned flight path. The vehicle/flight management system 208 may also be configured to determine landing trajectory. The planned flight path and/or landing trajectory may be determined using various planning algorithms, vehicle constraints (e.g., cruising speed, maximum speed, maximum/minimum altitude, maximum range, etc.) of vehicle 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the vehicle 131, or any combination thereof. The 4-D coordinates may include 3-D coordinates of space (e.g., latitude, longitude, and altitude) for a flight path and time coordinate.

The flight routing program of vehicle/flight management system 208 may determine an unplanned flight path based on the planned flight path and unplanned event triggers, and using the various planning algorithms, the vehicle constraints of the vehicle 131, and/or the external constraints. The vehicle/flight management system 208 may determine the unplanned event triggers based on data/information the vehicle/flight management system 208 receives from other vehicle system components. The unplanned event triggers may include one or a combination of: (1) emergency landing, as indicated by pilot/user interface 214, flight guidance component 210, and/or flight control system 212; (2) intruder vehicle 131*a*-133*b* encroaching on a safe flight envelope of the vehicle 131; (3) weather changes indicated by the route weather information (or updates thereto); (4) the machine vision outputs indicating a portion of the physical environment may be or will be within the safe flight envelope of the vehicle 131; and/or (5) the machine vision outputs indicating a landing zone is obstructed.

The vehicle/flight management system 208 may determine/compute landing trajectory based on vehicle performance (e.g., speed, altitude, position, time) and data received from vertiport database 230 (e.g., landing point), nav database 240 (e.g., waypoints), and obstacle database 250. The landing trajectory computed by the vehicle/flight management system 208 may be transmitted to flight guidance 210 and flight control system 212.

Position sensors 202 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the vehicle 131. The positioning information may include information about one or more of position (e.g., latitude and longitude, or Cartesian coordinates), altitude, speed, heading, or track, etc. for the vehicle. The positions sensors 202 may transmit the positioning information to the vehicle/flight management system 208, the flight guidance component 210, and/or the flight control system 212.

The obstacle detection sensor 204 may include one or more radar(s), one or more magnetometer(s), an attitude heading reference system (AHRS), light detection and ranging (LIDAR), and/or one or more air data module(s). The one or more radar(s) may be weather radar(s) to scan for weather and/or DAPA radar(s) (either omnidirectional and/or directional) to scan for terrain/ground/objects/obstacles. The one or more radar(s) (collectively "radar systems") may obtain radar information. The radar information may include information about the local weather and the terrain/ground/objects/obstacles (e.g., other vehicles or obstacles and associated locations/movement). The weather information may include information about precipitation, wind, turbulence, storms, cloud coverage, visibility, etc. of the external environment of the vehicle 131 along/near a flight path, at a destination and/or departure location (e.g., one of the hubs 111-117), or fora general area around the flight path, destination location, and/or departure location. The one or more magnetometer(s) may measure magnetism to obtain bearing information for the vehicle 131. The AHRS may include sensors (e.g., three sensors on three axes) to obtain attitude information for the vehicle 131. The attitude information may include roll, pitch, and yaw of the vehicle 131. The LIDAR may scan for obstacles and obtain LIDAR information. The air data module(s) may sense external air pressure to obtain airspeed information for the vehicle 131. The radar information, the bearing information, the attitude information, airspeed information, and/or the positioning information (collectively, obstacle detection information) may be transmitted to the vehicle/flight management system 208, flight guidance component 210, and/or flight control system 212.

Radio altimeter 206 may include a radar. The radar may be a low-range radio altimeter (LRRA) to measure the altitude or height of vehicle 131 above terrain/ground immediately below the vehicle. Radio altimeter 206 may obtain altitude information. The altitude information may be transmitted to the vehicle/flight management system 208, flight guidance component 210, and/or flight control system 212.

The camera(s) 220 may include inferred or optical cameras, LIDAR, or other visual imaging systems to record internal or external environments of the vehicle 131. The camera(s) 220 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 220 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed. Additionally or alternatively, the machine vision function may determine whether physical environment (e.g., buildings, structures, cranes, etc.) around the vehicle 131 and/or on/near the routes 141 may be or will be (e.g., based on location, speed, planned flight path of the vehicle 131) within a safe flight envelope of the vehicle 131. The imaging data and/or the machine vision outputs may be referred to as "imaging output data." The camera(s) 220 may transmit the imaging data and/or the machine vision outputs of the machine vision function to the vehicle/flight management system 208 and/or cockpit display system 260.

Vertiport database 230 may include hub data. For example, vertiport database 230 may store detailed maps. Hub data may include geographical and/or photographic information about hubs where vehicle 131 may depart/takeoff, land, pass through, or may alternatively travel to or through. Vertiport database 230 may include information about landing zones, landing pads, and runways, including identifiers and coordinates. Vertiport database 230 may transmit hub data to vehicle/flight management system 208 and/or cockpit display system 260.

Nav database 240 may include navigation data stored in nav database 240. The navigation data may include information related to navigation or routing of a vehicle, such as vehicle 131, in a geographic area. The navigation data stored in the nav database 240 may also include, for example, waypoints, routes, hubs (e.g., vertiports, airports, runways, landing zones, landing pads) airways, radio navigation aids, holding patterns, building profile data etc. In some embodiments, nav database 240 may include dynamic data such as three-dimensional coordinates for the intended or planned flight path of travel of the vehicle 131, and alternate paths of travel of the vehicle 131 (e.g., to avoid other vehicles 132, obstacles, or weather). Nav database 240 may transmit navigation data to vehicle/flight management system 208 and/or cockpit display system 260.

Obstacle database 250 may include obstacle data for an area around vehicle 131 and/or on/near the routes 141 and/or on/near a landing zone. Obstacle database 250 may be maintained by an organization such as the FAA. The obstacle data may include, for example, map data, almanac data, information regarding the dimensions and positions of one or more obstacles, and/or other information that may be relevant to a vehicle that is or will be in the vicinity of one or more obstacles. Obstacle database 250 may transmit obstacle data to vehicle/flight management system 208 and/or cockpit display system 260.

The flight guidance component 210 may receive data from vehicle/flight management system 208. In some embodiments, flight guidance component 210 may receive sensor data from position sensors 202, obstacle detection sensor 204, and/or radio altimeter 206. Flight guidance component 210 may process/analyze the received data to generate flight guidance data, instructions, and/or commands. Flight guidance component 210 may transmit flight guidance data/instructions to cockpit display system 260 and/or vehicle/flight management system 208. The flight guidance component 210 may also transmit data/instructions/commands to flight control system 212. In some embodiments, flight guidance component 210 may update flight guidance based on data which may be received from flight control system 212 and/or cockpit display system 260.

The flight control system 212 may receive flight guidance and/or commands from flight guidance component 210. The flight control system 212 may receive input from pilot/user interface 214 and inceptors 216 operated by pilot/user interface 214. Flight control system 212 may also receive sensor data from position sensors 202, obstacle detection sensor 204, and/or radio altimeter 206. The flight control system 212 may also receive data from cockpit display system 260. In some embodiments, flight control system 212 may transmit data to cockpit display system 260.

The flight control system 212 may execute a flight control program. The flight control program may control the actuators 218 in accordance with the flight guidance data or commands from flight guidance component 210, the sensor data received from one or more of position sensors 202, obstacle detection sensor 204, radio altimeter 206 (e.g., vehicle positioning information), the data received from cockpit display system 260, and/or user inputs (e.g., of a pilot if aircraft 131 is a piloted or semi-autonomous vehicle) via pilot/user interface 214 and inceptors 216. The flight control system 212 may receive flight guidance data/commands from flight guidance component 210 and/or the user inputs from pilot/user interface 214 and inceptors 216 (collectively, "course"), and may determine inputs to the actuators 218 to change speed, heading, altitude of the vehicle 131.

The actuators 218 may include: motors, engines, and/or propellers to generate thrust, lift, and/or directional force for the vehicle 131; flaps or other surface controls to augment the thrust, lift, and/or directional force for the vehicle 131; and/or vehicle mechanical systems (e.g., to deploy landing gear, windshield wiper blades, signal lights, etc.). The flight control system 212 may control the actuators 218 by transmitting instructions, in accordance with a flight control program.

The cockpit display system 260 may receive data from and/or transmit data to vehicle/flight management system 208, flight guidance component 210 and/or flight control system 212. The cockpit display system 260 may also receive data from vertiport database 230, nav database 240, and/or obstacle database 250. Cockpit display system may generate one or more displays based on the received data. The one or more displays include display 270, display 280, and/or display 290. A more detailed description of display 280 is provided further below in reference to FIG. 4 and a more detailed description of display 270 and display 290 are provided further below in reference to FIGS. 5 and 7, respectively. While the block diagram of system 200 of vehicle 131 depicts the one or more displays (270, 280, and 290) as part of cockpit display system 260 (i.e. onboard the vehicle 131), in at least one embodiment, the one or more displays may display off-board the vehicle 131, such as a remote operations ground station. In some embodiments, all three displays may be viewed at the same time. In other embodiments, only one display or a combination of two of displays may be viewed. It is understood that the one or more displays may include any number of displays and may display any one of the displays 270, 280, 290, or combinations thereof. The one or more displays may also include any system or device capable of conveying data related to a vehicle (e.g., vehicle 131) onboard the vehicle, off board the vehicle, or combinations thereof.

System 200 provides landing assistance to vehicle 131, as detailed further below.

Figure 3:
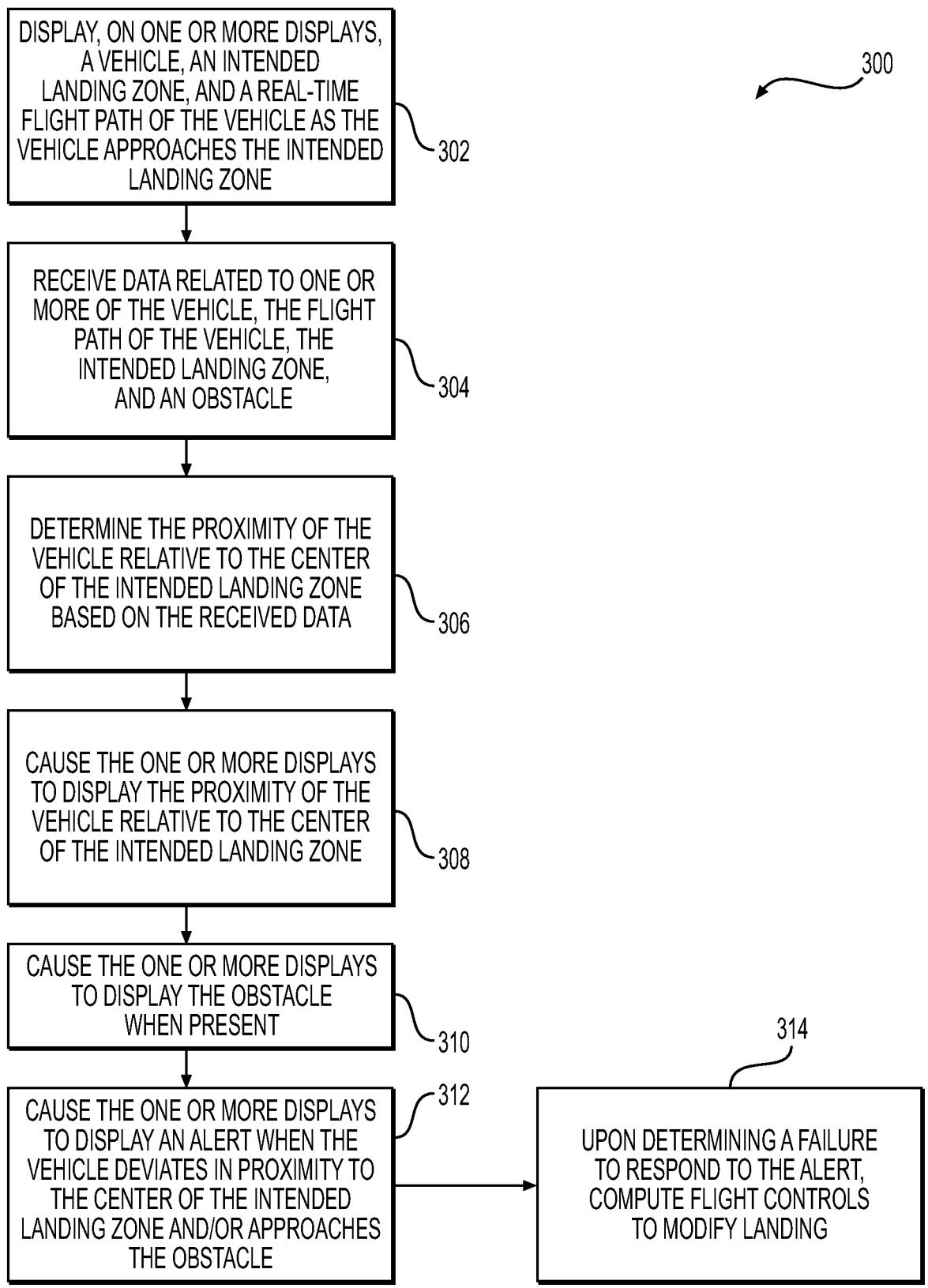
FIG. 3 depicts a flowchart of a method for providing safe landing assistance for a vehicle using the system of FIG. 2, according to one or more embodiments.

FIG. 3 depicts an exemplary flowchart of a method 300 for providing safe landing assistance to a vehicle, such as vehicle 131, according to one or more embodiments.

Step 302 may include displaying, on one or more displays, a vehicle, an intended landing zone, and a real-time flight path of the vehicle as the vehicle approaches the intended landing zone. In one aspect of the present disclosure, in step 302, the one or more displays of cockpit display system 260, display 270, display 280, and/or display 290 may display vehicle 131. The one or more displays may also display an intended landing zone, and a real-time flight path of the vehicle 131 as the vehicle 131 approaches the intended landing zone. In some embodiments, the display is generated from data received by cockpit display system 260 from vehicle/flight management system 208, camera(s) 220, nav database 240, and/or vertiport database 230.

Step 304 may include receiving data related to one or more of the vehicle, the flight path of the vehicle, the intended landing zone, and an obstacle. Data related to one or more of the vehicle, the flight path of the vehicle, the intended landing zone, and an obstacle may be received by vehicle/flight management system 208. For instance, the data received by vehicle/flight management system 208 may be transmitted from one or more of position sensors 202, obstacle detection sensor 204, radio altimeter 206, camera(s) 220, vertiport database 230, nav database 240, and obstacle database 250. In some examples, vehicle/flight management system 208 may receive data from cockpit display system 260 via a graphical user interface.

The data related to vehicle 131 may include sensor data and the sensor data may include positioning and/or orientation information. The positioning and/or orientation information may include information about one or more of the position, altitude, speed, and/or track for the vehicle 131. The data related to the flight path of vehicle 131 may include navigation data and a planned flight path of vehicle 131. Data related to the intended landing zone may include hub data (e.g., landing zone identifiers and coordinates), obstacle data, and navigation data (e.g., landing zone information, building profile data etc.) for the intended landing zone. Data related to an obstacle may include obstacle data such as map data and information regarding the dimensions and positions of one or more obstacles.

Step 306 may include determining the proximity of the vehicle relative to the center of the intended landing zone based on the received data (from step 304). For example, the vehicle/flight management system 208 may determine the proximity of the vehicle 131 relative to the center of the intended landing zone based on data related to the vehicle 131, the flight path of the vehicle 131, the intended landing zone, an obstacle, and combinations thereof, and received from one or more of position sensors 202, obstacle detection sensor 204, radio altimeter 206, camera(s) 220, vertiport database 230, nav database 240, and obstacle database 250.

Determining the proximity of the vehicle relative to the center of the intended landing zone may include receiving from the onboard system components, positioning and/or orientation information such as bearing information, the attitude information, the airspeed information, and/or the positioning information of the navigation data to indicate the position (e.g., GPS coordinate), altitude, orientation, speed (descent rate and/or other speed vector components), airspeed, and/or bearing of the vehicle 131. Determining the proximity of the vehicle relative to the center of the intended landing zone may further include analyzing the positioning and/or orientation information of the vehicle (e.g., vehicle 131) with the positional data (e.g. GPS coordinates) of the intended landing zone to determine one or a combination of: (1) distance from the intended landing zone; (2) a relative orientation from the intended landing zone; and/or (3) a position and/or altitude with respect to the intended landing zone. In one aspect, the positional data of the intended landing zone may be further analyzed with the positioning and/or orientation information of the vehicle to determine the relative orientation from the center of the intended landing zone and/or a position with respect to the center of the intended landing zone.

In some embodiments, the step of determining the proximity of the vehicle relative to the center of the intended landing zone may also include determining or computing the landing trajectory based on data related to one or more of the vehicle (e.g., vehicle performance, speed, altitude), the flight path of the vehicle, the intended landing zone, and an obstacle. Further, in at least one embodiment, the method of 300, may determine the proximity of the vehicle relative to any location within the intended landing zone, including but not limited to the center, based on the computed landing trajectory.

Step 308 may include causing the one or more displays to display the proximity of the vehicle relative to the center of the intended landing zone. For example, vehicle/flight management system 208 may cause display 270 and/or display 280 to display the proximity of vehicle 131 relative to the center of the intended landing zone Display 270 and/or display 280 may display the distance of vehicle 131 from the intended landing zone, the relative orientation of vehicle 131 from the intended landing zone and/or the position of vehicle 131 with respect to the intended landing zone, as detailed further below. In some embodiments, the proximity of the vehicle relative to the center of the intended landing zone may be displayed on the one or more displays, such as display 270 and/or display 280, by a landing aid symbol surrounding the intended landing zone. Dimensions of the landing aid symbol displayed may change (e.g., increase or decrease) relative to the distance of the vehicle from the intended landing zone. Further, display 290 may display the altitude of vehicle 131 with respect to the intended landing zone.

Step 310 may include causing the one or more displays to display the obstacle when present. In some examples, an obstacle may include one or more of another vehicle at or near the intended landing zone, a person at or near the intended landing zone, or a weather condition at or near the intended landing zone. Prior to causing the one or more displays to display an obstacle, vehicle/flight management system 208 may analyze data received from obstacle detection sensor 204, camera(s) 220, and obstacle database 250, as well as other system components to detect the presence of one or more obstacles. The LIDAR component of obstacle detection sensor 204 and/or camera(s) 220 may scan and map the intended landing zone area for obstacles. In some embodiments, camera(s) 220 may use a machine vision function to analyze the imaging data obtained. For instance, camera(s) 220 may obtain imaging data as vehicle 131 approaches the intended landing zone and the imaging data may be analyzed to detect obstacles at or near the intended landing zone. The imaging data and/or the machine vision outputs may be transmitted to the cockpit display system 260 for display on the one or more displays.

Step 312 may include causing the one or more displays to display an alert when the vehicle deviates in proximity to the center of the intended landing zone and/or approaches the obstacle. Step 314 may be performed when a failure to respond to the alert of step 312 is determined. In step 314, flight controls may be computed to modify landing. In one aspect of the present disclosure, once the proximity of the vehicle relative to the center of the intended landing zone is determined (step 306) and said proximity is displayed on the one or more displays (step 308), the proximity of the vehicle relative to the center of the intended landing zone will continue to be monitored as the vehicle descends. For instance, the one or more displays may display a landing aid symbol surrounding the intended landing zone, as detailed further below. The landing aid symbol may capture the positioning/orientation of the vehicle relative to the center of the intended landing zone and may provide a visual to indicate correct orientation of the vehicle or incorrect orientation of the vehicle relative to the center of the intended landing zone. In some examples, the landing aid symbol may display one or more colors based on the proximity of the vehicle to the center of the intended landing zone.

In some embodiments, flight guidance component 210 may determine that the deviation of the vehicle from center of the intended landing zone and/or the orientation of the vehicle relative to the center of the intended landing zone is either beyond the point of correction for a safe landing or close to reaching this point. As a result, an alert may be generated and the one or more displays may display the alert. The alert may display as a warning or the alert may indicate that the vehicle should "GO AROUND" or "ABORT LANDING". The alert may be visual. The alert may also be auditory.

In some embodiments, the vehicle system may determine that the vehicle is approaching the obstacle previously detected and displayed in step 308, during the landing phase. As the vehicle approaches the obstacle, an alert may be generated. For instance, if a person is detected as being at or near the intended landing zone and the vehicle is approaching said person, an alert may be generated on the one or more displays.

The alert may be generated as an instruction/warning to the pilot or remote pilot to abort the intended landing due to the presence of an obstacle and/or incorrect vehicle orientation, by going around the intended landing zone and re-attempting the landing. For instance, a pilot may want to leave the intended landing zone and return to re-attempt landing after an obstacle (e.g., another vehicle, person) is no longer present/detected. A pilot may also want to leave the intended landing zone and return to have more time to correct and/or adjust the orientation of the vehicle for a safe landing. In some examples, the vehicle may go around the intended landing zone and proceed to another landing zone.

In one aspect, the method may determine that the vehicle does not respond to the alert. A failure to respond to the alert means that the vehicle is continuing to approach the intended landing zone after the landing has been determined to be unsafe. When the landing is unsafe, the deviation of the vehicle in proximity to the center of the landing zone may not be able to be corrected before touchdown or an obstacle may be present at or near the intended landing zone. In step 314, when a failure to respond to the alert is determined, flight controls may be computed to modify the landing. Modifying landing may include performing a maneuver to a holding area or alternative landing zone. For instance, flight guidance component 210 may transmit instructions or commands to flight control system 212. Flight control system 212 may control actuators 218 to modify the landing by causing vehicle 131 to go around the intended landing zone and move to a holding area or an alternative landing zone.

In some embodiments where an obstacle is detected, flight guidance component 210 may transmit a command to flight control system 212 to perform an emergency procedure by modify the landing and causing the vehicle 131 to ascend, divert, or hover to avoid the obstacle. In these embodiments, the emergency procedure command may be triggered by pilot request, cockpit display system 260, or obstacle detection sensor 204. In addition, after vehicle 131 reaches a safe position due to the modified landing caused by flight guidance component 210 and flight control system 212, the flight guidance component 210 and flight control system 212 may automatically disengage, allowing the pilot or remote pilot to regain control.

Further, modifying the landing may include reducing or decreasing the rate of descent of the vehicle to allow for a safe landing. In some embodiments, it may be determined that there is only a slight deviation of the vehicle from the center of the intended landing that may be corrected if the rate of descent of the vehicle is reduced. In these embodiments, the flight control system 212 may control actuators 218 to decrease the descent rate.

Figure 4:
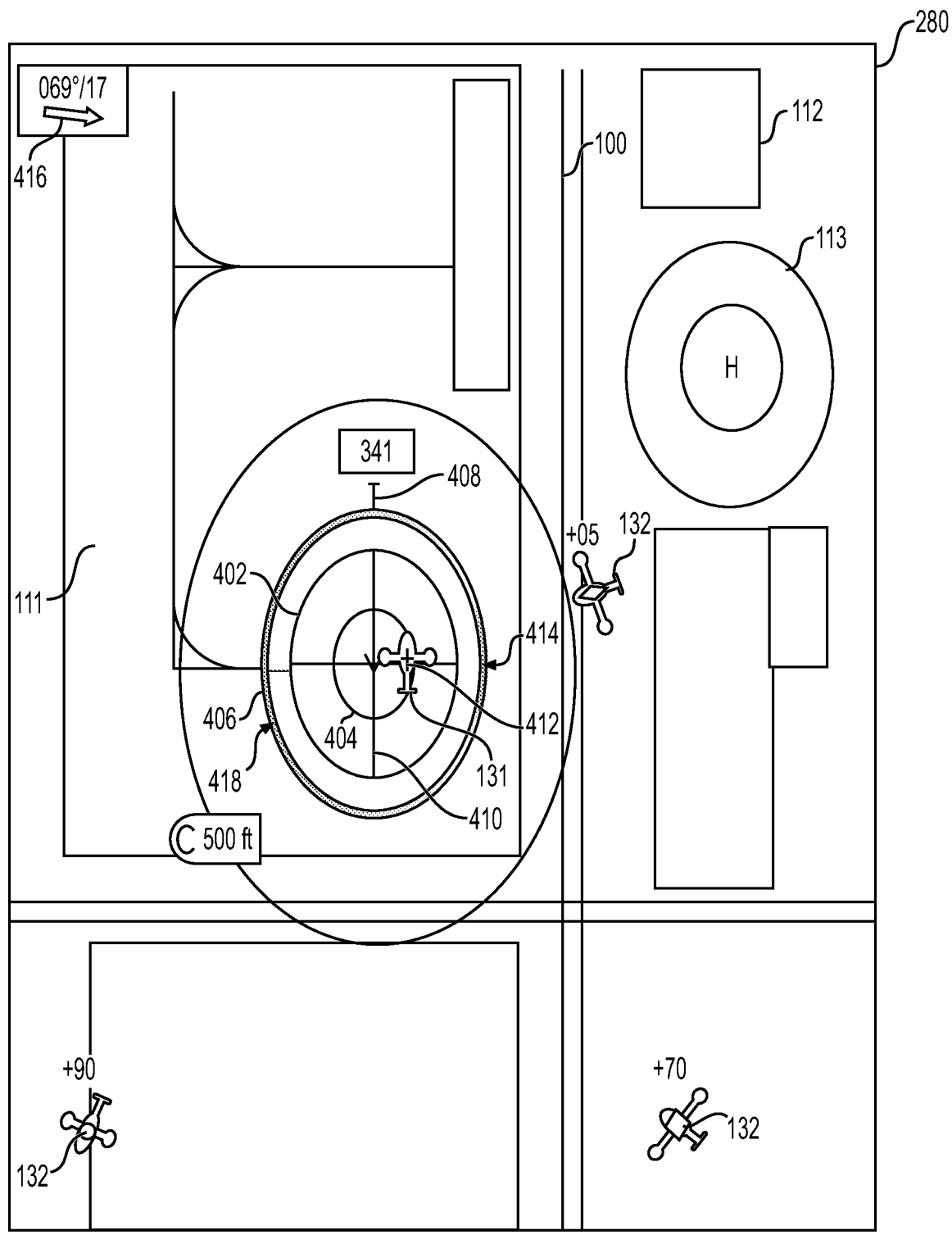
FIG. 4 depicts an exemplary display comprising a landing aid generated by the system of FIG. 2, according to one or more embodiments.

FIG. 4 depicts an exemplary display comprising a landing aid, according to one or more embodiments. More particularly, FIG. 4 depicts display 280 of system 200 described above with respect to FIG. 2. For instance, cockpit display system 260 may display the display 280. Display 280 may be referred to as a vertiport moving map, as it depicts a hub (e.g., vertiport) as vehicle 131 approaches the hub. Display 280 may depict airspace 100 described above with respect to FIG. 1.

Display 280 may serve as a moving map that displays a lateral profile of intended landing zone 402 and the flight path of vehicle 131 through airspace 100 as vehicle 131 approaches the intended landing zone 402. Display 280 displays hub 111 and nearby hubs 112 and 113 as well as vehicles 132, which share airspace 100 with vehicle 131. Each of hubs 111-113 may be building rooftops or elevated landing ports. Display 280 depicts an intended landing zone 402, located on top of hub 111 (e.g., a building). For instance, display 280 may show when vehicles other than vehicle 131 approach hub 111.

Landing aid symbol 406 may be generated around intended landing zone 402 and may generally correspond to a shape of the intended landing zone 402. For example, landing aid symbol 406 may be depicted as a circle that forms a ring around intended landing zone 402. However, it is understood that landing aid symbol 406 may be depicted as any shape as desired, and may be displayed in any location on the one or more displays.

Landing aid symbol 406 encompasses landing zone center 404, which corresponds to the center of intended landing zone 402. Landing aid symbol 406 also includes heading 408 and landing aid crosshair 410. Heading 408 may represent the compass direction in which the nose of vehicle 131 is directed. Display 280 may also depict landing deviation 414, which may be shown on landing aid symbol 406. Landing deviation 414 may depict the magnitude/amount of deviation and the direction of deviation of vehicle 131 from landing zone center 404. Display 280 may also depict alignment indicator 418. Alignment indicator 418 may be shown on landing aid symbol 406. Alignment indicator 418 may depict the magnitude/amount and/or the direction of correct alignment of vehicle 131 with landing zone center 404. Also depicted on display 280 is wind speed 416 and vehicle crosshair 412 on vehicle 131.

Landing aid symbol 406 may provide a visual representation of the proximity of vehicle 131 to landing zone center 404 of the intended landing zone 402. In order to achieve a safe landing vehicle crosshair 412 depicted on vehicle 131 should align with the landing aid crosshair 410. In some embodiments, the vehicle crosshair 412 may be configured to display an indicator to indicate alignment with the landing aid crosshair 410. The indicator may include any type of indicator for indicating alignment with the landing aid crosshair 410, such as, for example, a color, a highlight, a symbol, or any other indicator. For instance, when the vehicle crosshair 412 aligns with the landing aid crosshair 410, the vehicle crosshair 412 may display a green color. When the vehicle crosshair 412 is not aligned with the landing aid crosshair 410, the vehicle crosshair 412 may display a white color. Other indicators may also be used for vehicle crosshair 412 to distinguish between crosshair alignment and misalignment.

Landing aid symbol 406, which may be a circle, may display one or more indicators (e.g., colors) along the circumference of the circle. In some embodiments, a first indicator may indicate a correct orientation of the vehicle 131 for safe landing and a second indicator may indicate deviation of the vehicle 131 from the landing zone center 404 of the intended landing zone 402. In some embodiments, the second indicator displayed along the circumference of the circle may increase as the amount of deviation of the vehicle from the center of the intended landing zone increases and an amount of the first indicator displayed along the circumference of the circle may increase as the vehicle aligns with the center of the intended landing zone. For example, the first indicator may include a first color and the second indicator may include a second color. A shading of the first color may darken or otherwise become more pronounced as the vehicle aligns with the center of the intended landing zone. Similarly, a shading of the second color may darken or otherwise become more pronounced as the amount of deviation of the vehicle from the center of the intended landing zone increases.

Further, in some embodiments, the second color may be displayed toward the direction of deviation of the vehicle from the center of the intended landing zone. For instance, display 280 of FIG. 4 shows that vehicle 131 is not completely aligned with landing zone center 404. The vehicle crosshair 412 does not align with the landing aid cross hair 410. Furthermore, display 280 displays a slight deviation in proximity of vehicle 131 to landing zone center 404.

In FIG. 4 vehicle 131 deviates from the landing zone center 404 and landing deviation 414 indicates the degree and the direction of deviation. For example, a first color is shown around more than half the circumference of landing aid symbol 406 at alignment indicator 418, while a second color is shown at landing deviation 414. Landing deviation 414 represents the amount of deviation from landing zone center 404 and the direction of deviation. Vehicle 131 deviates to the right of landing zone center 404 and landing aid crosshair 410 in the direction of landing deviation 414. As vehicle crosshair 412 becomes more aligned with landing aid cross hair 410, landing deviation 414, and the second color thereon will disappear. When vehicle crosshair 412 completely aligns with landing aid crosshair 410, a color, or other indicator, representing a correct orientation of vehicle 131 will be displayed along the entire circumference of landing aid symbol 406 at alignment indicator 418.

To the contrary, when vehicle crosshair 412 is completely misaligned with landing aid crosshair 410, a color, or other indicator, indicating deviation of the vehicle 131 from the landing zone center 404 will be displayed along the entire circumference of landing aid symbol 406 at landing deviation 414. In the example of FIG. 4, landing aid symbol 406 may display various combinations in color difference between a first color representing correct orientation of vehicle 131 at alignment indicator 418 and a second color indicating deviation of vehicle 131 at landing deviation 414, as the orientation of the vehicle 131 is adjusted either toward landing zone center 404 and landing aid crosshair 410 or away from landing zone center 404 and landing aid crosshair 410. For instance, the amount of the second color displayed at landing deviation 414 will increase along the circumference of landing aid symbol 406 as vehicle 131 deviates farther from landing zone center 404.

Further, factors such as wind speed 416 (and direction) may impact the deviation and/or direction of deviation of vehicle 131 from landing zone center 404. Landing aid symbol 406 provides a pilot or a remote pilot guidance with respect to adjusting orientation of vehicle 131 during the landing phase. Heading 408 may also be referenced in extreme weather conditions (e.g., high winds) along with landing aid symbol 406 during the landing phase, in order to better align the physical orientation of vehicle 131 with landing zone center 404. In some instances where there is significant amount of deviation from landing zone center 404, more adjustments may be required. In other instances where there is very little deviation from landing zone center 404, only minor adjustments may be required and the vehicle 131 may continue in descent toward touchdown, in the absence of obstacles at the intended landing zone 402.

In one aspect, the size of the landing aid symbol may vary based on the altitude or height of the vehicle above the landing zone, indicating the scope for correcting deviation. For instance, the circumference of landing aid symbol 406 may decrease as the vehicle 131 descends closer to the intended landing zone 402 and the altitude of vehicle 131 decreases. A larger circumference of landing aid symbol 406 corresponds to vehicle 131 having more opportunities to adjust and/or correct alignment with landing aid crosshair 410 and landing zone center 404 prior to landing. The circumference of the landing aid symbol 406 at the hover point (i.e., the start of the vertical landing) may be large enough to provide scope for the vehicle 131 to align with landing aid crosshair 410 and landing zone center 404, but shrinks as vehicle 131 descends closer to the ground and/or the landing zone. Further, in some embodiments, the size of the landing aid at the hover point may correspond to the size of the actual vehicle. In other words, smaller landing aid symbols may be used for smaller vehicles and larger landing aid symbols may be used for larger vehicles.

In some aspects of the present disclosure, the size of the landing aid symbol may be computed dynamically based on a plurality of parameters. Parameters used in determining the size or dimensions of the landing aid symbol may include vehicle performance under various circumstances (e.g., different speeds, weights, air temperatures, pressures, and densities), vehicle maneuverability, and associated contextual data, such as weather and/or wind conditions. For example, the size or dimensions of the landing aid symbol may decrease as poor weather conditions deteriorate and may increase as weather conditions worsen.

While FIG. 4 depicts landing aid symbol 406 as a circle, the landing aid symbol of the present disclosure may be represented by other geometric shapes. In some examples, a color, such as a first color displayed at alignment indicator 418, indicating correct orientation of vehicle 131 may be green. A color, such as a second color displayed at landing deviation 414, indicating deviation of vehicle 131 may be red. However, other colors and/or indicators to indicate correct orientation of vehicle 131 and deviation of vehicle 131, respectively, are envisioned.

Figure 5:
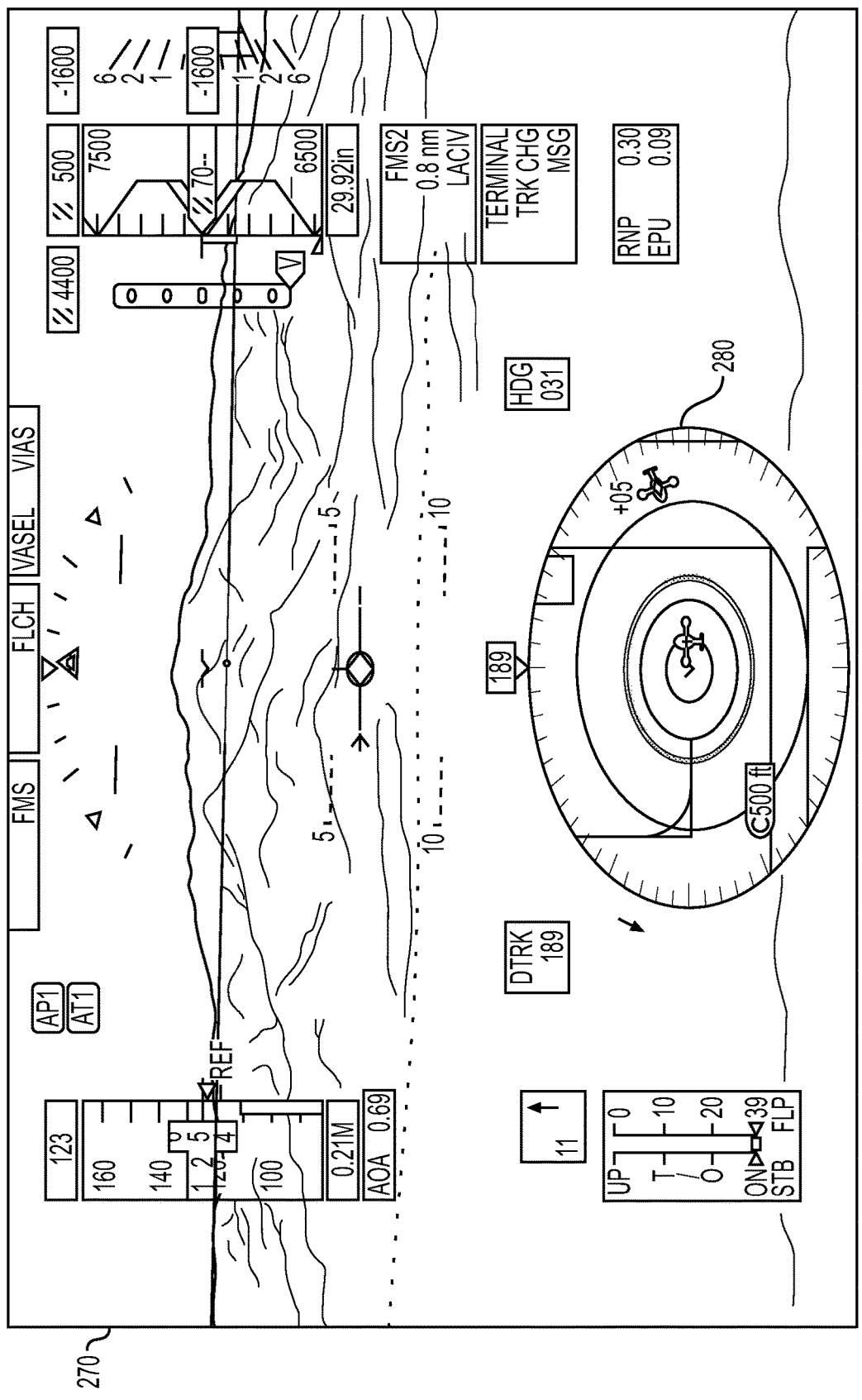
FIG. 5 depicts another exemplary display comprising a landing aid generated by the system of FIG. 2, according to one or more embodiments.

FIG. 5 depicts another exemplary display comprising a landing aid, according to one or more embodiments. More particularly, FIG. 5 depicts display 270 of system 200 described above with respect to FIG. 2. For instance, cockpit display system 260 may display the display 270.

As shown in FIG. 5, display 270 displays the display 280 as discussed above with respect to FIG. 4 on a horizontal situation indicator (HSI). Display 270 depicts the critical flight information for vehicle 131 (e.g., airspeed, altitude, heading, attitude, and vertical speed) in the same display as display 280. Display 280 may be embedded in display 270, so as to increase situational awareness and to facilitate faster pilot decision making during the critical landing phase.

Whether or not a vehicle may safely land may also depend on the vehicle's rate of descent or vertical speed during the landing phase. Even if the landing aid, such as landing aid symbol 406, provides guidance for adjusting the orientation of a vehicle with respect to the center of the intended landing zone, if the vehicle is descending too quickly, the vehicle may not have enough time to correct or adjust the orientation before reaching the landing zone.

Figure 6:
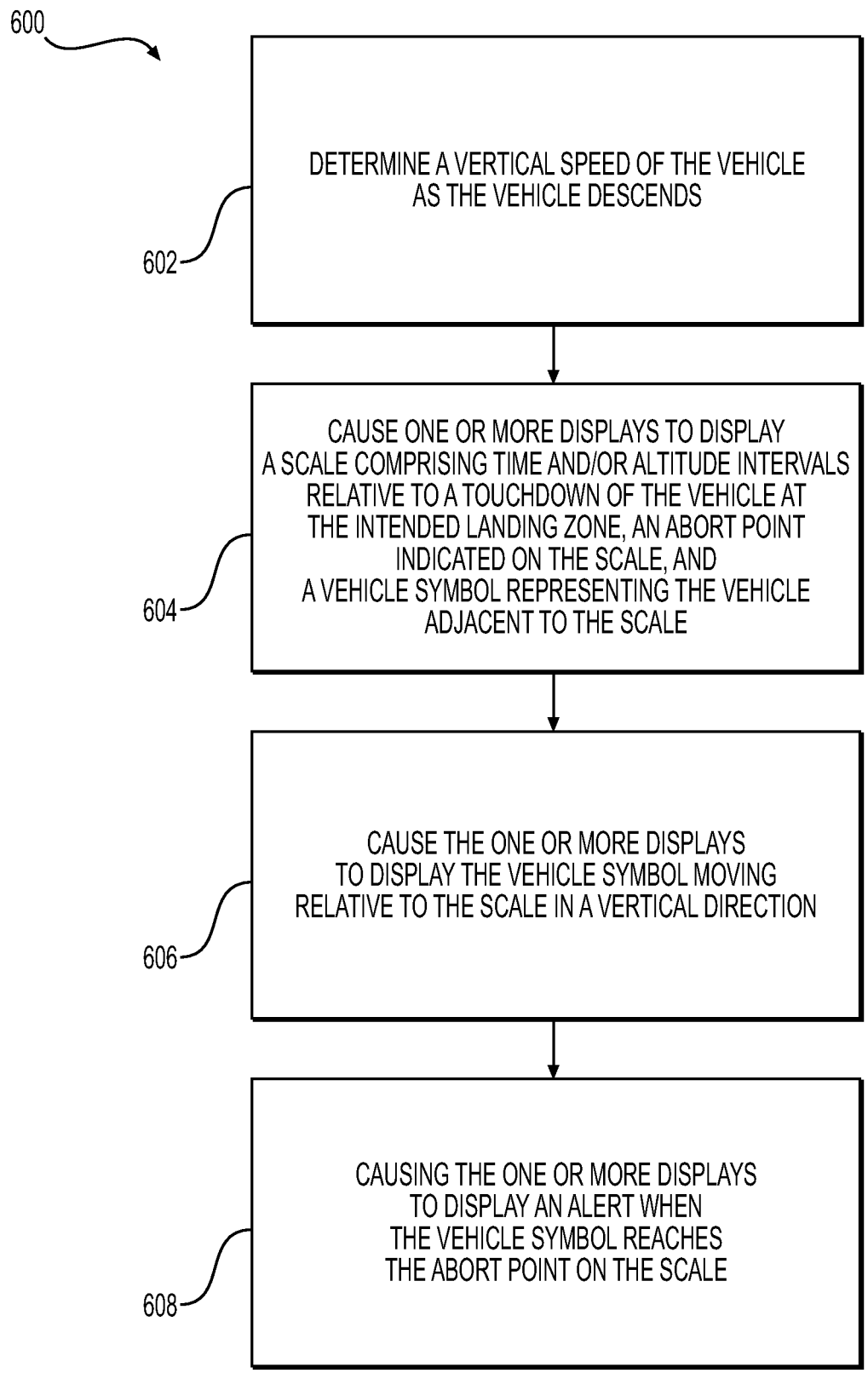
FIG. 6 depicts a flowchart of a method for monitoring vehicle descent conditions relative to touchdown, according to one or more embodiments.

Thus, FIG. 6 depicts a flowchart for a method 600 for monitoring vehicle descent conditions relative to touchdown, according to one or more embodiments. For instance, method 600 may be used to monitor the descent of vehicle 131 as the vehicle 131 approaches landing or touchdown at the intended landing zone 402.

In step 602, a vertical speed of the vehicle as the vehicle descends during the landing phase may be determined. In some embodiments, the radar signals from the radar(s) of vehicle system 200 may be used to determine the vertical speed of the vehicle 131. For instance, the vertical speed or descent rate (e.g., a time derivative of the altitude) may be determined by data received by vehicle/flight management system 208 from one or more of position sensors 202, the radar from obstacle detection sensor 204, and radio altimeter 206.

Step 604 may include causing the one or more displays to display a scale comprising time and/or altitude intervals relative to a touchdown of the vehicle at the intended landing zone and a vehicle symbol representing the vehicle adjacent to the scale. The scale may also include an abort point indicated between the intervals on the scale.

Step 606 may involve causing the one or more displays to display the vehicle symbol moving relative to the scale in a vertical direction, as the vehicle descends towards the intended landing zone. Further, in step 608, the method may include causing the one or more displays to display an alert when the vehicle symbol reaches the abort point on the scale.

In one aspect of the present disclosure, the abort point represents a point on the time/altitude to touchdown scale, until which the vehicle may continue descent toward the intended landing zone while adjusting orientation of the vehicle relative to the center of the intended landing zone. For the purposes of the present disclosure, the abort point may be the point at which a pilot must make a decision on whether to abort the landing and to execute a missed approach maneuver. The abort point may be based on the given flight conditions and may indicate the point at which it is no longer possible for a landing to be completed, while satisfying all safe landing criteria. In other words, after the abort point on the scale is reached, there is insufficient time to adjust the orientation of the vehicle and still achieve a safe landing. If the vehicle 131 is not oriented with the center of the intended landing zone by the time the vehicle symbol reaches the abort point on the scale, then an alert to "GO-AROUND" is generated and displayed. The abort point may be calculated based on the horizontal deviation of vehicle 131 and the height above the ground (e.g., landing zone), which determines the scope for correcting deviation. If it is determined that there is not enough height between vehicle 131 and the intended landing zone for vehicle 131 to align with the landing zone center, then the system may alert vehicle 131 to abort the landing and to execute a missed approach maneuver. In some embodiments, the abort point may also take into account parameters such as vehicle weight, vehicle flight state (e.g. position, orientation, vertical speed), vehicle performance, vehicle maneuverability, external factors (e.g., weather, outside air temperature, visibility), and landing altitude.

In some embodiments, the steps of method 600 may be performed concurrently with some of the steps of method 300. For instance, when the proximity of the vehicle relative to the center of the intended landing zone is determined in step 306, the vertical speed of the vehicle may be determined as specified in step 602. When the one or more displays display the proximity of the vehicle relative to the center of the intended landing zone and any obstacles present in steps 308 and 310, the one or more displays may display the time/altitude to touchdown scale and the vehicle symbol moving relative to the scale in a vertical direction in steps 604 and 606.

Causing the one or more displays to display an alert when the vehicle symbol reaches the abort point on the scale in step 608 of method 600 may also cause the display of the alert when the vehicle deviates in proximity to the center of the intended landing zone in step 312 of method 300. For instance, the display of the alert in step 608 may be triggered by the vehicle being beyond the point of an orientation adjustment for aligning with the center of the intended landing zone before touchdown. Thus, step 608 may correlate with the vehicle deviating in proximity to the center of the intended landing zone and causing the one or more displays to display an alert in step 312. Once an alert is displayed as a result of the vehicle symbol reaching the abort point on the scale in step 608, if it is determined that there is no response to the alert, flight controls may be computed to modify the landing.

In the method 600, the vehicle symbol displayed adjacent to the time/altitude to touchdown scale may also display an indicator, such as a color. The color displayed on the vehicle symbol may correspond to a color designated based on the vertical speed determined for the vehicle. In some embodiments, a first indicator, such as a green color, indicates that the vertical speed of the vehicle is optimal. When the vehicle symbol displays a first indicator (e.g., green color) as the vehicle symbol descends down the time/altitude to touchdown scale and approaches the abort point, this correlates with an acceptable speed (e.g. vertical speed is within a nominal range) that is suitable for adjusting the orientation of the vehicle in time for landing touchdown.

In some embodiments, a second indicator, such as an amber color, indicates that there is an increase in vertical speed. An increase in vertical speed may indicate that the vehicle symbol may reach the abort point on the scale sooner. Thus, there may be less time to correct the deviation of the vehicle before the abort point. When the vehicle symbol displays a second indicator (e.g., an amber color), this may prompt the pilot or remote pilot to decrease the speed of the vehicle. Further, in some embodiments, a third indicator, such as a red color indicates that the vertical speed is beyond tolerance. A third indicator (e.g., red color) may display on the vehicle symbol when the vehicle descends at a rate where any deviation from the center of the intended landing zone cannot be corrected or the abort point has been reached on the time/altitude to touchdown scale and deviation still exists. While different colors are described herein, it is understood that the indicator may include any type of indicator, such as, for example, a color, a highlight, a symbol, or any other type of indicator, or combinations thereof, for indicating a speed tolerance of the vehicle with respect to the abort point.

Figure 7:
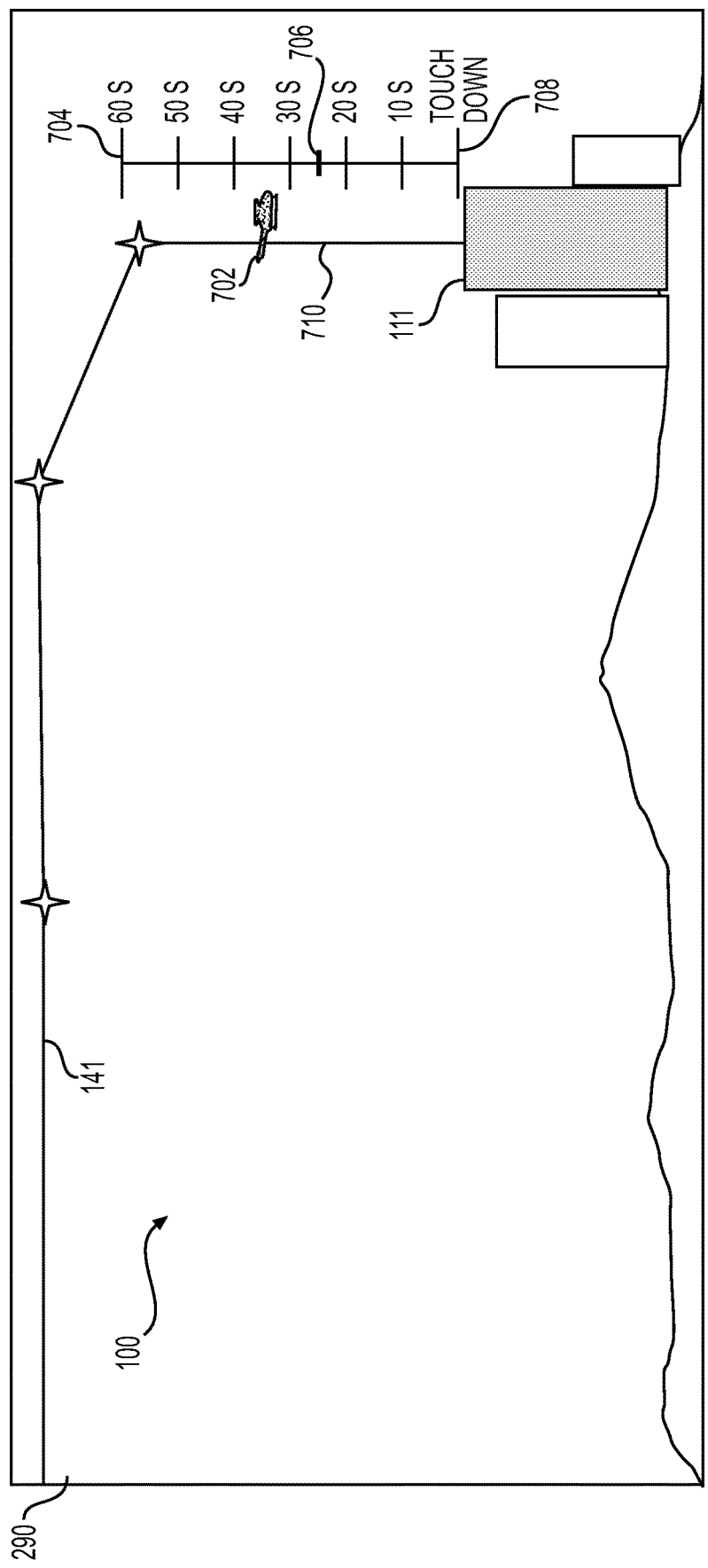
FIG. 7 depicts yet another exemplary display comprising a time/altitude relative to touchdown scale generated by the system of FIG. 2, according to one or more embodiments.

FIG. 7 depicts an exemplary display comprising a time/altitude relative to touchdown scale, according to one or more embodiments. More particularly, FIG. 7 depicts display 290 of system 200 described above with respect to FIG. 2. For instance, cockpit display system 260 may display the display 290. Display 290 may depict airspace 100 described above with respect to FIG. 1.

Display 290 may display a vertical or profile view of vehicle 131, symbolized with vehicle symbol 702, as it approaches an intended landing zone at hub 111. Hub 111 is depicted as a building, surrounded by other buildings. Vehicle symbol 702 is shown adjacent to time/altitude relative to touchdown scale 704. The scale includes intervals denoting the amount of time (e.g., seconds) and/or altitude (e.g., feet) from touchdown at the intended landing zone. Therefore, the scale represents time and/or altitude for a vehicle relative to touchdown 708. The scale may be based on the altitude of vehicle 131 determined at the hover point of vehicle 131 above the intended landing zone or at the start of the descent toward the intended landing zone. For example, the scale may be determined based on the physical height of vehicle 131 from the intended landing zone (e.g. vertiport). In the examples of FIGS. 7 and 8A-10B, the scale 704 is represented as a time remaining until touchdown. Time/altitude relative to touchdown scale 704 also contains an abort point 706, determined as detailed above, and indicated as an interval on the scale.

Display 290 may display vehicle symbol 702 moving in a vertical direction relative to time/altitude relative to touchdown scale 704, as vehicle 131 descends toward the intended landing zone at hub 111. Landing trajectory 710, which is depicted as a vertical line between the last waypoint represented by the star symbol above the hover point of vehicle symbol 702 and touchdown 708, may represent the landing trajectory for vehicle 131 as computed by the vehicle/flight management system 208. In some embodiments, the intended landing zone may be highlighted, such as with a color, to display the intended landing zone area (e.g., hub 111).

Display 290 of FIG. 7 depicts an embodiment where vehicle symbol 702 has not reached abort point 706 on time/altitude relative to touchdown scale 704. FIG. 7 also demonstrates that vehicle symbol 702 may display a color based on the vertical speed determined for vehicle 131 relative to abort point 706. For instance, vehicle symbol 702 may display a color that indicates that the vertical speed of vehicle 131 is optimal as vehicle symbol 702 descends time/altitude relative to touchdown scale 704 and approaches the abort 706.

Figures 8A, 8B:
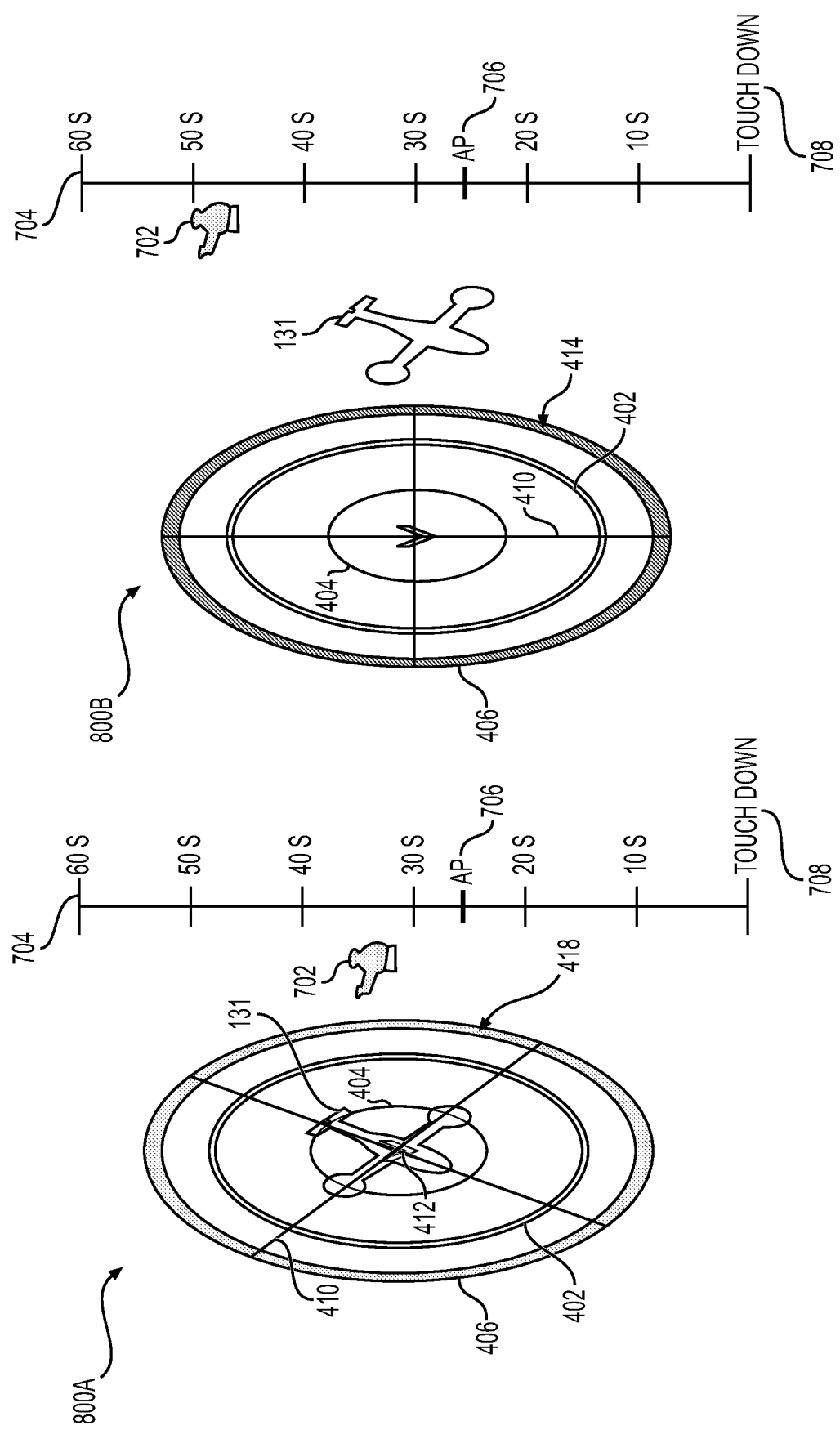

FIGS. 8A and 8B depict exemplary landing scenarios as displayed with landing aids, according to one or more embodiments. FIG. 8A depicts landing scenario 800A, while FIG. 8B depicts landing scenario 800B. Each of landing scenarios 800A and 800B represent a display of landing aid symbol 406 of display 280 and a time/altitude relative to touchdown scale 704 of display 290, which may be viewed together and used to assist a pilot or a remote pilot in the landing phase, according to aspects of the present disclosure.

Landing scenario 800A depicts the use of the landing aids according to the present disclosure. Landing scenario 800A may depict a scenario where the orientation of vehicle 131 is properly aligned with the center of the intended landing zone and configured for a safe landing. For instance, landing scenario 800A shows that the vehicle crosshair 412 is perfectly aligned with the landing aid crosshair at the landing zone center 404 of intended landing zone 402. In this scenario, vehicle crosshair 412 displays a color, such as green (e.g., depicted as a light shading in FIG. 8A), to indicate alignment with landing aid crosshair 410, at alignment indicator 418. Furthermore, 800A demonstrates that landing aid symbol 406, displays the same color (e.g., green) around the entire circumference of landing aid symbol 406 at alignment indicator 418. The uniform color suggests that there is no deviation of vehicle 131. Landing scenario 800A also depicts that vehicle symbol 702 has not reached the abort point 706 on the time/altitude relative to touchdown scale 704.

Landing scenario 800B depicts the use of the landing aids according to the present disclosure. Landing scenario 800B may depict a scenario where there is significant deviation of vehicle 131 in proximity to the landing zone center 404 of the intended landing zone 402. In 800B vehicle 131 is completely outside of landing aid symbol 406. Therefore, landing aid symbol 406 displays landing deviation 414. Furthermore, landing scenario 800B demonstrates that landing aid symbol 406, displays the same color (e.g., red) around the entire circumference of landing aid symbol 406, which corresponds to landing deviation 414. Landing scenario 800B also depicts that vehicle symbol 702 has not reached the abort point 706 on the time/altitude relative to touchdown scale 704. Further, vehicle symbol 702 displays a color (e.g., green) to indicate that the vertical speed of vehicle 131 is optimal.

FIGS. 9A and 9B depict exemplary landing scenarios as displayed with landing aids, according to one or more embodiments. FIG. 9A depicts landing scenario 900A, while FIG. 9B depicts landing scenario 900B. Each of landing scenarios 900A and 900B represent a display of landing aid symbol 406 of display 280 and a time/altitude relative to touchdown scale 704 of display 290, which may be viewed together and used to assist a pilot or a remote pilot in the landing phase, according to aspects of the present disclosure.

Landing scenario 900A depicts the use of the landing aids according to the present disclosure. Landing scenario 900A may depict a scenario where there is a slight deviation of vehicle 131 in proximity to landing zone center 404. For instance, in landing scenario 900A vehicle crosshair 412 does not align with landing aid crosshair 410. Landing aid symbol 406 displays two different colors. Further, landing deviation 414 is also depicted on landing aid symbol 406, displaying a color that indicates deviation. The location of landing deviation 414 also corresponds to the direction of deviation of vehicle 131 (e.g., to the right of the landing zone center 404). Alignment indicator 418 is depicted on landing aid symbol 406, displaying a color that indicates alignment. The color depicted at alignment indicator 418, increases as vehicle crosshair 412 of vehicle 131 aligns with landing aid crosshair 410 at landing zone center 404.

Landing scenario 900A also depicts that vehicle symbol 702 has not reached the abort point 706 on the time/altitude relative to touchdown scale 704. Further, vehicle symbol 702 displays a color (e.g., green) to indicate that the vertical speed of vehicle 131 is optimal. Therefore, landing scenario 900A suggests that a pilot or a remote pilot has sufficient time to adjust the orientation and correct the slight deviation of vehicle 131 to be in alignment with landing zone center 404 for a safe landing. Once alignment is reached, landing deviation 414 will disappear and the color around landing aid symbol 406 will be uniform, indicating a correct orientation.

Landing scenario 900B depicts the use of the landing aids according to the present disclosure. Landing scenario 900B may depict a scenario where there is a deviation of vehicle 131 in proximity to landing zone center 404. For instance, in landing scenario 900B vehicle crosshair 412 does not align with landing aid crosshair 410. Landing scenario 900B also depicts that there is a wingspan difference between vehicle crosshair 412 and landing aid crosshair 410. Landing aid symbol 406 displays two different colors (e.g., depicted as two different shades in FIG. 9B). Further, landing deviation 414 is also depicted on landing aid symbol 406, displaying a color that indicates deviation. The location of landing deviation 414 also corresponds to the direction of deviation of vehicle 131 (e.g., to the right of the landing zone center 404). Alignment indicator 418 is depicted on landing aid symbol 406, displaying a color that indicates alignment. The color depicted at alignment indicator 418, increases as vehicle crosshair 412 of vehicle 131 aligns with landing aid crosshair 410 at landing zone center 404.

Landing scenario 900B also depicts that vehicle symbol 702 has already reached the abort point 706 on the time/altitude relative to touchdown scale 704, and has moved beyond the abort point 706. Further, vehicle symbol 702 displays a color (e.g., red) to indicate that the vertical speed of vehicle 131 is beyond tolerance. Therefore, landing scenario 900B suggests that a warning will be displayed or output, since vehicle 131 is not in alignment with landing zone center 404 and the vehicle 131 has reached a point where the orientation can no longer be adjusted as indicated by the time/altitude relative to touchdown scale 704 and vehicle symbol 702.

Figures 10A, 10B:
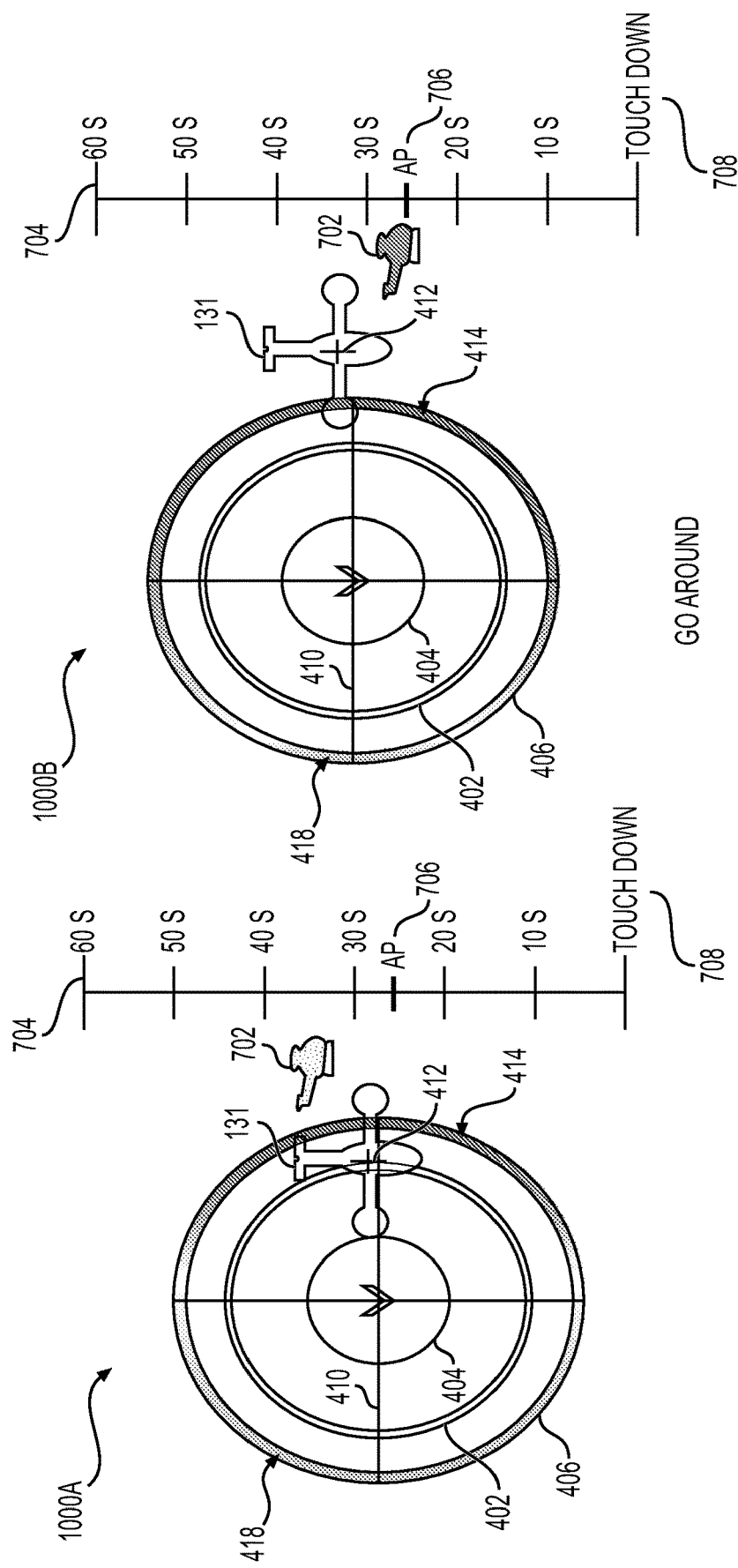

FIGS. 10A and 10B depict exemplary landing scenarios as displayed with landing aids, according to one or more embodiments. FIG. 10A depicts landing scenario 1000A, while FIG. 10B depicts landing scenario 1000B. Each of landing scenarios 1000A and 1000B represent a display of landing aid symbol 406 of display 280 and a time/altitude relative to touchdown scale 704 of display 290, which may be viewed together and used to assist a pilot or a remote pilot in the landing phase, according to aspects of the present disclosure.

Landing scenario 1000A depicts the use of the landing aids according to the present disclosure. Landing scenario 1000A may depict a scenario where there is significant deviation of vehicle 131 in proximity to landing zone center 404. For instance, in landing scenario 1000A vehicle crosshair 412 does not align with landing aid crosshair 410. Landing scenario 1000A also depicts that there is nearly twice a wingspan difference between vehicle crosshair 412 and landing aid crosshair 410. In this scenario, vehicle crosshair 412 is also slightly above the location of landing aid crosshair 410. Landing aid symbol 406 displays two different colors. Further, landing deviation 414 is also depicted on landing aid symbol 406, displaying a color that indicates deviation and alignment indicator 418 is depicted on landing aid symbol 406, displaying a color that indicates alignment. The location of landing deviation 414 also corresponds to the direction of deviation of vehicle 131 (e.g., to the right of the landing zone center 404). Landing scenario 1000A shows that half of vehicle 131 is inside of landing aid symbol 406 and that half of vehicle 131 is outside of landing aid symbol 406, corresponding to alignment indicator 418 and landing deviation 414, respectively.

Landing scenario 1000A also depicts that vehicle symbol 702 has not reached the abort point 706 on the time/altitude relative to touchdown scale 704. Further, vehicle symbol 702 displays a color (e.g., yellow or amber) to indicate that the vertical speed of vehicle 131 has increased. Therefore, landing scenario 1000A suggests that the vehicle 131 is rapidly approaching the abort point 706 with considerable deviation of the vehicle 131 from landing zone center 404 remaining. Once the vehicle reaches the abort point, there will no longer be an opportunity to adjust the orientation of the vehicle. Landing scenario 1000A may suggest to a pilot or remote pilot that the vertical speed of the vehicle 131 needs to be quickly decreased in order to continue with adjusting the orientation of the vehicle before a warning is issued.

Landing scenario 10006 depicts the use of the landing aids according to the present disclosure. Landing scenario 1000B may depict a scenario where there is significant deviation of vehicle 131 in proximity to the landing zone center 404 of the intended landing zone 402. In landing scenario 1000B vehicle 131 is almost completely outside of landing aid symbol 406. Therefore, landing aid symbol 406 displays landing deviation 414. Furthermore, landing scenario 1000B demonstrates that landing aid symbol 406, displays a color (e.g., red) corresponding with landing deviation 414 around nearly half the circumference of landing aid symbol 406.

Landing scenario 1000B also depicts that vehicle symbol 702 has reached the abort point 706 on the time/altitude relative to touchdown scale 704. Vehicle symbol 702 displays a color (e.g., red) to indicate that the vertical speed of vehicle 131 is beyond tolerance. Further, 1000B represents a scenario where a "GO AROUND" warning is displayed when there is significant deviation of vehicle 131 in proximity to the landing zone center 404 and the vehicle 131 has reached a point where adjustments can no longer be made to the orientation of the vehicle in time for a safe landing.

FIG. 11 depicts an example system that may execute techniques presented herein. FIG. 11 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1160 for packet data communication. The platform may also include a central processing unit ("CPU") 1120, in the form of one or more processors, for executing program instructions. The platform may include an internal communication bus 1110, and the platform may also include a program storage and/or a data storage for various data files to be processed and/or communicated by the platform such as ROM 1130 and RAM 1140, although the system 1100 may receive programming and data via network communications. The system 1100 also may include input and output ports 1150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing a safe landing for a vehicle, the method comprising:
    displaying, on one or more displays, a vehicle, an intended landing zone, and a real-time flight path of the vehicle as the vehicle approaches the intended landing zone;
    receiving, by one or more processors, data related to one or more of the vehicle, the flight path of the vehicle, the intended landing zone, a vertical speed, and an obstacle;
    determining, by the one or more processors, the proximity of the vehicle relative to a center of the intended landing zone based on the received data;
    causing, by the one or more processors, the one or more displays to display the proximity of the vehicle relative to the center of the intended landing zone;
    causing, by the one or more processors, the one or more displays to display the obstacle when present;
    causing, by the one or more processors, the one or more displays to display a first alert when the vehicle deviates in proximity to the center of the intended landing zone and/or approaches the obstacle;
    causing, by the one or more processors, the one or more displays to display a scale comprising time intervals relative to a touchdown of the vehicle at the intended landing zone, an abort point indicated on the scale, and a vehicle symbol representing the vehicle adjacent to the scale, wherein the abort point represents a point at which there is insufficient time to achieve a correct orientation of the vehicle for safe landing;
    causing, by the one or more processors, the one or more displays to display the vehicle symbol moving relative to the scale in a vertical direction;
    causing, by the one or more processors, the one or more displays to display a second alert when the vehicle symbol reaches the abort point on the scale, wherein:
        the vehicle symbol displays a first indicator when the vertical speed as the vehicle approaches the abort point is within a nominal range;
        the vehicle symbol displays a second indicator when the vertical speed as the vehicle approaches the abort point increases; and
        the vehicle symbol displays a third indicator when the vertical speed as the vehicle approaches the abort point increases beyond tolerance for a safe landing;
    upon determining a failure to respond to the first alert or the second alert, by the one or more processors, compute flight controls to modify landing; and
    controlling the vehicle based on the computed modified flight controls, wherein controlling the vehicle comprises transmitting, from the one or more processors, one or more control instructions configured to control actuators of the vehicle to modify the landing to cause the vehicle to perform a maneuver to one of a holding area and alternative landing zone.

2. The method of claim 1, wherein the proximity of the vehicle relative to the center of the intended landing zone is displayed by a landing aid symbol surrounding the intended landing zone, and wherein the landing aid symbol displays one or more indicators based on the proximity of the vehicle to the center of the intended landing zone.

3. The method of claim 2, wherein the one or more indicators are displayed along a circumference or perimeter of the landing aid symbol.

4. The method of claim 3, wherein the circumference or perimeter of the landing aid symbol changes based on one or more parameters.

5. The method of claim 4, wherein the one or more parameters includes: height of the vehicle above the intended landing zone, vehicle size, vehicle performance, vehicle maneuverability, wind factors, and weather conditions.

6. The method of claim 2, wherein a first indicator indicates a correct orientation of the vehicle for safe landing and wherein a second indicator indicates deviation of the vehicle from the center of the intended landing zone.

7. The method of claim 6, wherein the second indicator becomes more pronounced as the amount of deviation of the vehicle from the center of the intended landing zone increases and wherein the first indicator becomes more pronounced as the vehicle aligns with the center of the intended landing zone.

8. The method of claim 6, wherein the second indicator is displayed toward the direction of deviation.

9. The method of claim 1, wherein the intended landing zone is a building rooftop or an elevated landing zone.

10. The method of claim 1, wherein the one or more displays include an onboard display system, an off board display system, or a combination thereof.

11. The method of claim 1, further comprising:
   determining, by the one or more processors, a vertical speed and an orientation of the vehicle as the vehicle descends; and
   determining, by the one or more processors, an amount of time until touchdown at the intended landing zone based on the vertical speed and the proximity of the vehicle relative to the center of the intended landing zone.

12. The method of claim 11, wherein the abort point that represents the point at which there is insufficient time to achieve a correct orientation of the vehicle for safe landing is determined based at least in part on the orientation of the vehicle and the amount of time until touchdown at the intended landing zone.

13. The method of claim 1, wherein the one or more control instructions are configured to cause the vehicle to perform one of going around the intended landing zone and to re-approach the intended landing zone to re-attempt landing and automatically executing a missed approach maneuver.

14. The method of claim 1, wherein the obstacle includes one or more of another vehicle at or near the intended landing zone, a person at or near the intended landing zone, or a weather condition.

15. The method of claim 1, wherein the abort point is determined based on vehicle parameters, the vehicle parameters comprising weight, vehicle flight state, vehicle performance, vehicle maneuverability, and landing altitude.

16. The method of claim 1, wherein the vehicle symbol representing the vehicle adjacent to the scale is a profile view of the vehicle.

17. A system for providing a safe landing for a vehicle, the system comprising:
   one or more sensors, the one or more sensors executed by one or more processors and configured to:
      determine one or more obstacles at an intended landing zone of a vehicle and/or along a flight path of the vehicle;
      determine a vertical speed of the vehicle;
      determine a position and/or an altitude of the vehicle relative to a center of the intended landing zone; and
      transmit sensor data to one or more displays, a vehicle management system, and/or a flight guidance component;
   one or more databases, the one or more databases configured to:
      transmit data related to one or more of a flight path of the vehicle, an intended landing zone, or obstacles, to one or more displays and a vehicle management system;
   a vehicle management system, the vehicle management system executed by one or more processors and configured to:
      receive data from one or more sensors;
      receive data from one or more databases;
      process the data received from the one or more sensors with the data received from the one or more databases; and
      transmit the processed data to a flight guidance component and/or one or more displays; and
   one or more displays, the one or more displays executed by one or more processors and configured to:
      receive data from one or more databases, a vehicle management system, and/or a flight guidance component; and
      display the received data;
   wherein:
      the one or more displays are further configured to:
         display a scale comprising time intervals relative to a touchdown of the vehicle at the intended landing zone, an abort point indicated on the scale, and a vehicle symbol representing the vehicle adjacent to the scale, wherein the abort point represents a point at which there is insufficient time to achieve a correct orientation of the vehicle for safe landing,
         display the vehicle symbol moving relative to the scale in a vertical direction,
         display a second alert when the vehicle symbol reaches the abort point on the scale, wherein:
            the vehicle symbol displays a first indicator when the vertical speed as the vehicle approaches the abort point is within a nominal range;
            the vehicle symbol displays a second indicator when the vertical speed as the vehicle approaches the abort point increases, and
            the vehicle symbol displays a third indicator when the vertical speed as the vehicle approaches the abort point increases beyond tolerance for a safe landing,
      the vehicle management system is further configured to transmit commands to a flight control system, wherein the flight control system is configured to:
         compute flight controls to modify landing of the vehicle based on commands received from the flight guidance component in instances in which the vehicle deviates in proximity to the center of the intended landing zone and/or approaches the obstacle and when the vehicle symbol reaches the abort point on the scale; and
         control the vehicle based on the modified flight controls computed by the flight control system, wherein controlling the vehicle comprises receiving, from the flight control system, one or more control instructions configured to control actuators of the vehicle to modify the landing to cause the vehicle to perform a maneuver to one of a holding area and alternative landing zone.

18. The system of claim 17, wherein the one or more displays is further configured to:
   display a proximity of the vehicle relative to a center of the intended landing zone based on the data received from one or more of the vehicle management system, flight guidance component, and one or more databases; and
   display an alert when the vehicle deviates in proximity to the center of the intended landing zone and/or approaches an obstacle.

19. The system of claim 17, further comprising a flight guidance component, the flight guidance component executed by one or more processors and configured to:
   receive processed data from the vehicle management system;
   generate flight guidance based on the received data; and
   transmit the flight guidance to one or more displays.

20. A non-transitory computer-readable medium storing instructions that, when executed by a processor, cause the processor to perform a method for providing a safe landing for a vehicle, the method comprising:

displaying, on one or more displays, a vehicle, an intended landing zone, and a real-time flight path of the vehicle as the vehicle approaches the intended landing zone;

receiving data related to one or more of the vehicle, the flight path of the vehicle, the intended landing zone, a vertical speed, and an obstacle;

determining the proximity of the vehicle relative to a center of the intended landing zone based on the received data;

causing the one or more displays to display the proximity of the vehicle relative to the center of the intended landing zone;

causing the one or more displays to display the obstacle when present;

causing the one or more displays to display a first alert when the vehicle deviates in proximity to the center of the intended landing zone and/or approaches the obstacle;

causing, by the one or more processors, the one or more displays to display a scale comprising time intervals relative to a touchdown of the vehicle at the intended landing zone, an abort point indicated on the scale, and a vehicle symbol representing the vehicle adjacent to the scale, wherein the abort point represents a point at which there is insufficient time to achieve a correct orientation of the vehicle for safe landing;

causing, by the one or more processors, the one or more displays to display the vehicle symbol moving relative to the scale in a vertical direction;

causing, by the one or more processors, the one or more displays to display a second alert when the vehicle symbol reaches the abort point on the scale, wherein:
  the vehicle symbol displays a first indicator when the vertical speed as the vehicle approaches the abort point is within a nominal range;
  the vehicle symbol displays a second indicator when the vertical speed as the vehicle approaches the abort point increases; and
the vehicle symbol displays a third indicator when the vertical speed as the vehicle approaches the abort point increases beyond tolerance for a safe landing;

upon determining a failure to respond to the first alert or the second alert, compute flight controls to modify landing; and controlling the vehicle based on the computed modified flight controls, wherein controlling the vehicle comprises transmitting one or more control instructions configured to control actuators of the vehicle to modify the landing to cause the vehicle to perform a maneuver to one of a holding area and alternative landing zone.

* * * * *